United States Patent
Ore et al.

(10) Patent No.: US 11,607,948 B1
(45) Date of Patent: Mar. 21, 2023

(54) ELECTRONICALLY-VARIABLE POWER SHIFT TRANSMISSION FOR WORK VEHICLES

(71) Applicant: Deere & Company, Moline, IL (US)

(72) Inventors: Thomas G. Ore, Cedar Falls, IA (US); Ronald D. Bremner, Cedar Falls, IA (US); Michael A. Rehberg, Walker, IA (US)

(73) Assignee: DEERE & COMPANY, Moline, IL (US)

( * ) Notice: Subject to any disclaimer, the term of this patent is extended or adjusted under 35 U.S.C. 154(b) by 0 days.

(21) Appl. No.: 17/559,496

(22) Filed: Dec. 22, 2021

(51) Int. Cl.
| | |
|---|---|
| *B60K 6/547* | (2007.10) |
| *B60K 6/48* | (2007.10) |
| *F16D 21/00* | (2006.01) |
| *B60K 6/387* | (2007.10) |
| *F16H 37/06* | (2006.01) |

(Continued)

(52) U.S. Cl.
CPC .............. *B60K 6/547* (2013.01); *B60K 6/365* (2013.01); *B60K 6/387* (2013.01); *B60K 6/48* (2013.01); *F16D 21/00* (2013.01); *F16H 37/065* (2013.01); *B60K 2006/4825* (2013.01);
(Continued)

(58) Field of Classification Search
CPC . F16H 37/065; F16H 2200/006; B60K 6/547; B60K 6/22; B60K 6/365; B60K 6/48; B60K 2006/4825
See application file for complete search history.

(56) References Cited

U.S. PATENT DOCUMENTS

| | | | |
|---|---|---|---|
| 3,214,987 | A | 11/1965 | Schenck et al. |
| 3,626,787 | A | 12/1971 | Singer |

(Continued)

FOREIGN PATENT DOCUMENTS

| | | |
|---|---|---|
| AT | 11545 U1 | 12/2010 |
| CN | 101255907 A | 9/2008 |

(Continued)

OTHER PUBLICATIONS

Schmetz, Roland, Electromechanische Traktorgetriebe Getriebe mit Zukunft, Electromechanical Tractor Units—Gearboxes with a Future, Landtechnik, Agricultural Engineering, vol. 54; Issue 2; pp. 72-73, Feb. 1999.

(Continued)

*Primary Examiner* — Stacey A Fluhart
(74) *Attorney, Agent, or Firm* — Klintworth & Rozenblat IP LLP

(57) ABSTRACT

A transmission includes an input assembly, an electric machine, a variator and a power shift assembly. The input assembly has directional clutches and is configured to receive rotational engine input power. The variator has only a single planetary set configured and combine to receive rotational input power from the electric machine and the input assembly. The power shift assembly is configured to receive rotational power from the variator, and it includes speed gears, range gears and power shift clutches and an output shaft. The power shift clutches are configured to dissipate energy from asynchronous gear meshing. The power shift assembly is configured to effect multiple different rotational power flows through to the output shaft that arise from meshing gears at each shift to effect a unique one of multiple gear ratios.

18 Claims, 11 Drawing Sheets

(51) Int. Cl.
B60K 6/365 (2007.10)
B62D 49/06 (2006.01)

(52) U.S. Cl.
CPC .......... B60Y 2200/92 (2013.01); B62D 49/06 (2013.01); F16H 2200/006 (2013.01)

(56) References Cited

U.S. PATENT DOCUMENTS

| | | |
|---|---|---|
| 3,651,904 A | 3/1972 | Snoy |
| 3,714,845 A | 2/1973 | Mooney, Jr. |
| 3,783,711 A | 1/1974 | Orshansky, Jr. |
| 4,090,414 A | 5/1978 | White |
| 4,164,155 A | 8/1979 | Reed et al. |
| 4,164,156 A | 8/1979 | Reed |
| 5,156,577 A | 10/1992 | Fredriksen et al. |
| 5,277,286 A | 1/1994 | Yamamoto et al. |
| 5,353,662 A | 10/1994 | Vaughters |
| 5,508,574 A | 4/1996 | Vlock |
| 5,931,757 A | 8/1999 | Schmidt |
| 6,254,509 B1 | 7/2001 | Meyer |
| 6,394,925 B1 | 5/2002 | Wontner et al. |
| 6,478,705 B1 | 11/2002 | Holmes et al. |
| 6,641,505 B2 | 11/2003 | Sayman et al. |
| 6,684,148 B2 | 1/2004 | Chess |
| 7,008,342 B2 | 3/2006 | Dyck et al. |
| 7,252,611 B2 | 8/2007 | Raghavan et al. |
| 7,294,079 B2 | 11/2007 | Raghavan et al. |
| 7,311,627 B2 | 12/2007 | Tarasinski |
| 7,329,201 B2 | 2/2008 | Raghavan et al. |
| 7,367,911 B2 | 5/2008 | Raghavan et al. |
| 7,377,876 B2 | 5/2008 | Yang |
| 7,399,246 B2 | 7/2008 | Holmes et al. |
| 7,465,251 B2 | 12/2008 | Zhang |
| 7,473,201 B2 | 1/2009 | Raghavan et al. |
| 7,479,081 B2 | 1/2009 | Holmes |
| 7,491,144 B2 | 2/2009 | Conlon |
| 7,611,433 B2 | 11/2009 | Forsyth |
| 7,901,314 B2 | 3/2011 | Salvaire et al. |
| 7,942,776 B2 | 5/2011 | Conlon |
| 8,234,956 B2 | 8/2012 | Love et al. |
| 8,257,213 B2 | 9/2012 | Komada et al. |
| 8,439,787 B2 | 5/2013 | Salamandra et al. |
| 8,469,127 B2 | 6/2013 | Tarasinski et al. |
| 8,500,585 B2 | 8/2013 | Kim et al. |
| 8,573,340 B2 | 11/2013 | Tarasinski et al. |
| 8,579,751 B2 | 11/2013 | Phillips |
| 8,596,157 B2 | 12/2013 | Vu |
| 8,660,724 B2 | 2/2014 | Tarasinski et al. |
| 8,734,281 B2 | 5/2014 | Ai et al. |
| 8,747,266 B2 | 6/2014 | Aitzetmueller et al. |
| 8,784,246 B2 | 7/2014 | Treichel et al. |
| 8,790,202 B2 | 7/2014 | Sakai et al. |
| 8,944,194 B2 | 2/2015 | Glaser et al. |
| 8,986,162 B2 | 3/2015 | Dix et al. |
| 9,002,560 B2 | 4/2015 | Hasegawa |
| 9,097,342 B2 | 8/2015 | Dix et al. |
| 9,206,885 B2 | 12/2015 | Rekow et al. |
| 9,487,073 B2 | 11/2016 | Love et al. |
| 9,562,592 B2 | 2/2017 | Rekow et al. |
| 9,840,165 B2 | 12/2017 | Cox |
| 9,840,827 B2 | 12/2017 | Miyamoto et al. |
| 9,944,163 B2 | 4/2018 | McKinzie |
| 9,981,665 B2 | 5/2018 | Rekow et al. |
| 10,119,598 B2 | 11/2018 | Rekow et al. |
| 10,619,711 B2 | 4/2020 | Fliearman et al. |
| 10,647,193 B2 | 5/2020 | McKinzie et al. |
| 10,655,710 B2 | 5/2020 | Rekow et al. |
| 10,670,124 B2 | 6/2020 | Rekow et al. |
| 10,738,868 B2 | 8/2020 | McKinzie et al. |
| 10,975,959 B2 | 4/2021 | McKinzie et al. |
| 11,052,747 B2 | 7/2021 | Ore |
| 11,091,018 B2 | 8/2021 | Ore et al. |
| 11,137,052 B2 | 10/2021 | Ore et al. |
| 2001/0016536 A1 | 8/2001 | Minowa et al. |
| 2003/0186769 A1 | 10/2003 | Ai et al. |
| 2004/0094381 A1 | 5/2004 | Versteyhe |
| 2004/0172184 A1 | 9/2004 | Vukovich et al. |
| 2005/0036894 A1 | 2/2005 | Oguri |
| 2005/0049100 A1 | 3/2005 | Ai et al. |
| 2006/0046886 A1 | 3/2006 | Holmes et al. |
| 2006/0111212 A9 | 5/2006 | Ai et al. |
| 2006/0142104 A1 | 6/2006 | Saller |
| 2006/0276291 A1 | 12/2006 | Fabry et al. |
| 2007/0021256 A1 | 1/2007 | Klemen et al. |
| 2007/0021257 A1 | 1/2007 | Klemen et al. |
| 2007/0249455 A1 | 10/2007 | Hasegawa et al. |
| 2008/0171626 A1 | 7/2008 | Pollman |
| 2009/0250278 A1 | 10/2009 | Kawasaki et al. |
| 2010/0048338 A1 | 2/2010 | Si |
| 2010/0179009 A1 | 7/2010 | Wittkopp et al. |
| 2010/0261565 A1 | 10/2010 | Ai et al. |
| 2011/0130235 A1 | 6/2011 | Phillips |
| 2012/0157254 A1 | 6/2012 | Aitzetmueller et al. |
| 2013/0023370 A1 | 1/2013 | Grad et al. |
| 2013/0123055 A1 | 5/2013 | Mattsson et al. |
| 2013/0173126 A1 | 7/2013 | Ruebsam |
| 2013/0211655 A1 | 8/2013 | Ogata et al. |
| 2013/0231815 A1 | 9/2013 | Tanishima et al. |
| 2013/0325238 A1 | 12/2013 | Kato et al. |
| 2014/0018201 A1 | 1/2014 | Tolksdorf |
| 2014/0248986 A1 | 4/2014 | Weeramantry et al. |
| 2014/0128196 A1 | 5/2014 | Rintoo |
| 2014/0128217 A1 | 5/2014 | Tabata et al. |
| 2014/0315685 A1 | 10/2014 | Hofler |
| 2015/0006007 A1 | 1/2015 | Kitahata et al. |
| 2015/0072823 A1 | 3/2015 | Rintoo |
| 2015/0142232 A1 | 5/2015 | Tabata et al. |
| 2015/0142282 A1 | 5/2015 | Lee et al. |
| 2015/0183436 A1 | 7/2015 | Rekow et al. |
| 2015/0184726 A1 | 7/2015 | Rekow et al. |
| 2015/0292608 A1 | 10/2015 | McKinzie |
| 2016/0090091 A1 | 3/2016 | Gugel et al. |
| 2016/0201295 A1 | 7/2016 | Kishimoto et al. |
| 2016/0272059 A1 | 9/2016 | Watanabe et al. |
| 2017/0066447 A1 | 3/2017 | Hertel et al. |
| 2017/0102059 A1 | 4/2017 | Rekow et al. |
| 2017/0129477 A1 | 5/2017 | Ideshio et al. |
| 2017/0203646 A1 | 7/2017 | Mueller et al. |
| 2017/0284508 A1 | 10/2017 | Devreese |
| 2017/0284517 A1 | 10/2017 | Rekow et al. |
| 2017/0328453 A1 | 11/2017 | McKinzie et al. |
| 2018/0022353 A1 | 1/2018 | Thompson et al. |
| 2018/0043764 A1 | 2/2018 | McKinzie et al. |
| 2018/0056982 A1 | 3/2018 | Endo et al. |
| 2018/0149247 A1 | 5/2018 | Rekow et al. |
| 2018/0298993 A1* | 10/2018 | Fliearman ............ B60K 6/445 |
| 2019/0118642 A1* | 4/2019 | Cho ................... F16H 3/093 |
| 2019/0337376 A1 | 11/2019 | Ore |
| 2019/0344654 A1* | 11/2019 | Kaltenbach ......... B60K 6/547 |
| 2019/0346036 A1 | 11/2019 | Ore et al. |
| 2019/0389298 A1* | 12/2019 | Kaltenbach ......... B60K 6/547 |
| 2020/0309258 A1 | 10/2020 | McKinzie et al. |
| 2021/0062900 A1 | 3/2021 | Ore et al. |

FOREIGN PATENT DOCUMENTS

| | | |
|---|---|---|
| CN | 102844588 A | 12/2012 |
| DE | 1173348 B | 7/1964 |
| DE | 4010919 A1 | 10/1991 |
| DE | 4131572 A1 | 3/1993 |
| DE | 19621200 A1 | 11/1997 |
| DE | 19954636 A1 | 5/2001 |
| DE | 201500200973 | 5/2001 |
| DE | 10128076 A1 | 12/2002 |
| DE | 10319252 A1 | 11/2004 |
| DE | 102006041160 A1 | 9/2008 |
| DE | 102008032320 A1 | 1/2010 |
| DE | 202009007972 U1 | 5/2010 |
| DE | 10201102210 A1 | 3/2011 |
| DE | 10201105868 | 3/2011 |
| DE | 102010026460 A1 | 3/2011 |
| DE | 102010021846 A1 | 12/2011 |
| DE | 102011102184 A1 | 7/2012 |
| DE | 112006002537 B4 | 8/2012 |

(56) References Cited

FOREIGN PATENT DOCUMENTS

| | | |
|---|---|---|
| DE | 102012216781 A1 | 3/2013 |
| DE | 102011115002 A1 | 4/2013 |
| DE | 102013009649 A1 | 12/2014 |
| DE | 102013220167 A1 | 4/2015 |
| DE | 202015102282 U1 | 5/2015 |
| DE | 102014225298 A1 | 7/2015 |
| DE | 102015215461 A1 | 2/2016 |
| DE | 102015220635 A1 | 5/2016 |
| DE | 102015205932 A1 | 10/2016 |
| DE | 112006000524 B4 | 2/2017 |
| DE | 102016116324 A1 | 3/2017 |
| DE | 102016120965 A1 | 5/2017 |
| DE | 102016204727 A1 | 9/2017 |
| DE | 102018108510 A1 | 10/2018 |
| DE | 102018209940 A1 | 12/2018 |
| DE | 102018212712 A1 | 1/2019 |
| DE | 102019204706 A1 | 11/2019 |
| DE | 102019205211 A1 | 11/2019 |
| DE | 102018213871 A1 | 2/2020 |
| DE | 102020003597 A1 | 9/2020 |
| DE | 102020209003 A1 | 3/2021 |
| DE | 102020211888 A1 | 5/2021 |
| DE | 102020215219 A2 | 6/2021 |
| EP | 01099882 A2 | 10/1991 |
| EP | 805059 A2 | 11/1997 |
| EP | 01707416 | 8/2007 |
| EP | 02855226 | 8/2007 |
| EP | 02466168 | 6/2012 |
| EP | 02466169 | 6/2012 |
| EP | 2631144 B1 | 8/2013 |
| EP | 2682531 A1 | 1/2014 |
| EP | 2832567 A1 | 2/2015 |
| JP | 6462174 B1 | 11/1997 |
| WO | 2007017975 A1 | 2/2007 |
| WO | 2008019799 A2 | 2/2008 |
| WO | 2011092643 A1 | 8/2011 |
| WO | 2012171812 A1 | 12/2012 |
| WO | 2017107848 A1 | 6/2017 |

OTHER PUBLICATIONS

John M. Miller, Hybrid Electric Vehicle Propulsion System Architectures of the e-CVT Type, IEEE Transactions on Power Electronics, vol. 21, No. 3, May 2006.
Jian Dong, Zuomin Dong, Curran Crawford, Review of Continuously Variable Transmission Powertrain System for Hybrid Electric Vehicles, Proceedings of the ASME 2011 International Mechanical Engineering Congress & Exposition, IMECE2011-63321, Nov. 11-17, 2011.
DEERE & Company, Utility U.S. Appl. No. 16/670,210, filed Oct. 31, 2019.
DEERE & Company, Utility U.S. Appl. No. 16/946,685, filed Jul. 1, 2020.
DEERE & Company, Utility U.S. Appl. No. 17/066,746, filed Oct. 9, 2020.
DEERE & Company, Utility U.S. Appl. No. 17/154,729, filed Jan. 21, 2021.
DEERE & Company, Utility U.S. Appl. No. 17/171,856, filed Feb. 9, 2021.
CNIPA Office Action for Application No. 201510165982.4 dated Aug. 9, 2018, Serial Notice No. 2018080601675890.
German Search Report for application No. 10215206174 dated Jul. 16, 2015.
German Search Report for application No. 1020182036705 dated Dec. 20, 2018.
German Search Report for application No. 102018210616 dated Feb. 1, 2019.
German Search Report for application No. 1020182099391 dated Feb. 27, 2019.
German Search Report for application No. 1020182099405 dated Feb. 28, 2019.
German Search Report for application No. 102018212712 dated Apr. 12, 2019.
German Search Report for application No. 102019205211 dated Sep. 5, 2019.
German Search Report for application No. 102019204706 dated Dec. 17, 2019.
German Search Report for German application No. 1020202026513 dated Sep. 1, 2020.
German Search Report issued in application No. 102020213675.0 dated Mar. 17, 2021. (10 pages).
German Search Report issued in counterpart application No. 102020209003.3 dated Apr. 15, 2021 (10 pages).
German Search Report issued in counterpart application No. 102017220666.7 dated May 28, 2021. (10 pages).
Extended European Search Report issued in counterpart application No. 20205965.5 dated Jul. 28, 2021. (10 pages).
USPTO, Office Action in U.S. Appl. No. 14/249,258 dated Apr. 21, 2017.
USPTO, Office Action in U.S. Appl. No. 15/664,289 dated Dec. 13, 2018.
USPTO, Final Office Action in U.S. Appl. No. 15/971,867 dated Jun. 24, 2020.
USPTO, Final Office Action issued in U.S. Appl. No. 16/555,913 dated Apr. 20, 2021.
USPTO, Office Action in U.S. Appl. No. 14/249,258 dated Aug. 22, 2017.
USPTO, Office Action in U.S. Appl. No. 14/249,258 dated Oct. 17, 2016.
USPTO, Office Action in U.S. Appl. No. 14/536,097 dated Sep. 25, 2017.
USPTO, Office Action in U.S. Appl. No. 15/485,911 dated Feb. 8, 2019.
USPTO, Office Action in U.S. Appl. No. 15/628,979 dated Nov. 5, 2019.
USPTO, Office Action in U.S. Appl. No. 15/664,289 dated Jul. 26, 2018.
USPTO, Office Action in U.S. Appl. No. 15/793,522 dated Apr. 18, 2019.
USPTO, Office Action in U.S. Appl. No. 15/879,796 dated Aug. 23, 2019.
USPTO, Office Action in pending U.S. Appl. No. 15/971,867 dated Dec. 12, 2019.
USPTO, Office Action in U.S. Appl. No. 16/371,598 dated Jul. 21, 2020.
USPTO, Office Action in U.S. Appl. No. 16/555,913 dated Jan. 4, 2021.
USPTO, Office Action in U.S. Appl. No. 17/066,746 dated Oct. 26, 2021.
DEERE & Company, Utility U.S. Appl. No. 17/538,691, filed Nov. 30, 2021.
German Search Report issued in application No. DE102021214746.1 with translation, dated Jun. 30, 2022. (25 pages).
USPTO, Non-Final Office Action issued in U.S. Appl. No. 17/154,729 dated Jul. 15, 2022. (7 pages).
German Search Report issued in application No. DE102021212506.9 with translation, dated Jun. 20, 2022. (24 pages).
German Search Report issued in application No. DE102021209495.3 with translation, dated Jan. 11, 2022 (24 pages).
USPTO, Ex Parte Quayle Action issued in U.S. Appl. No. 17/171,856, filed Oct. 11, 2022.
USPTO, Non-Final Office Action issued in U.S. Appl. No. 17/538,691 dated Sep. 15, 2022.

* cited by examiner

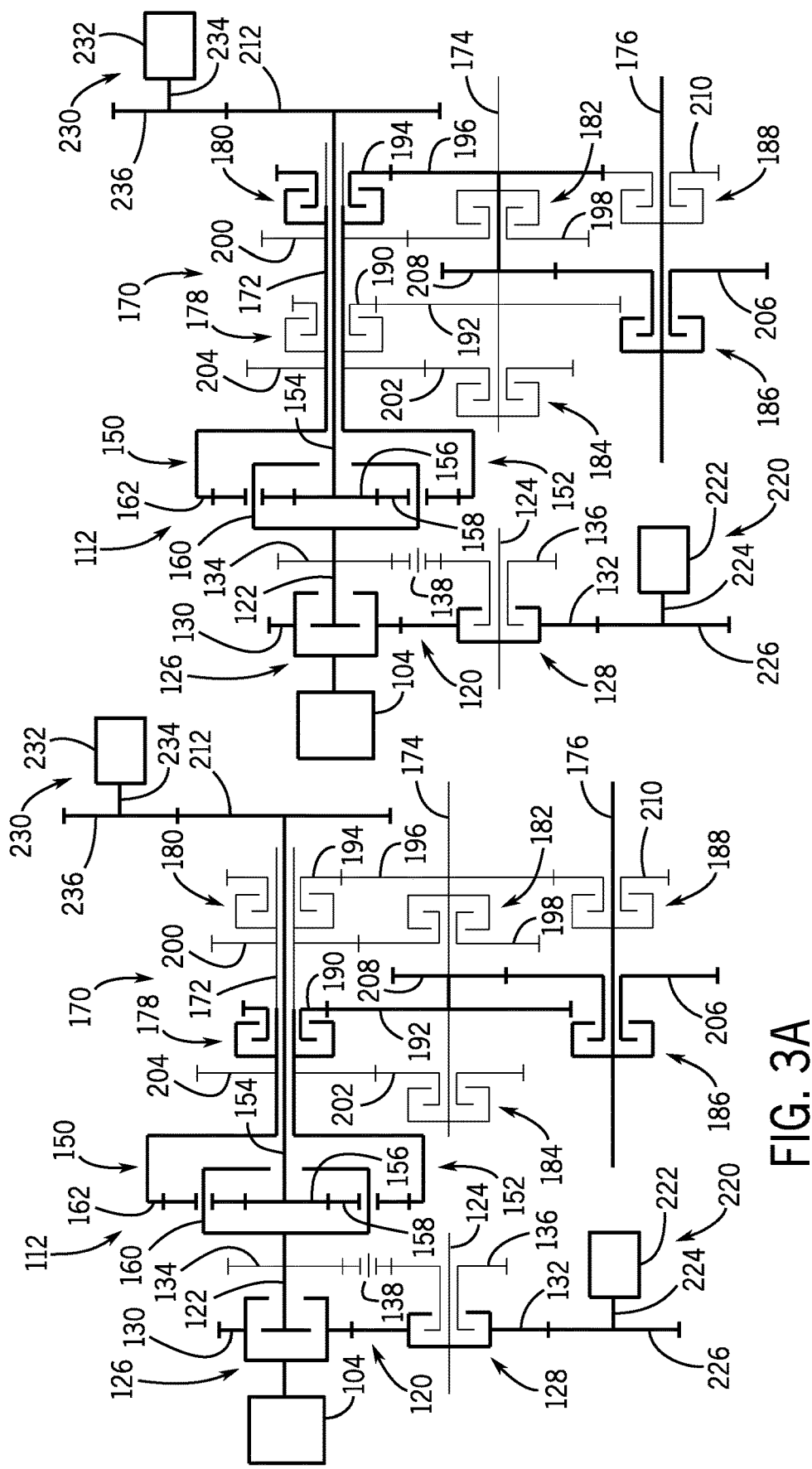

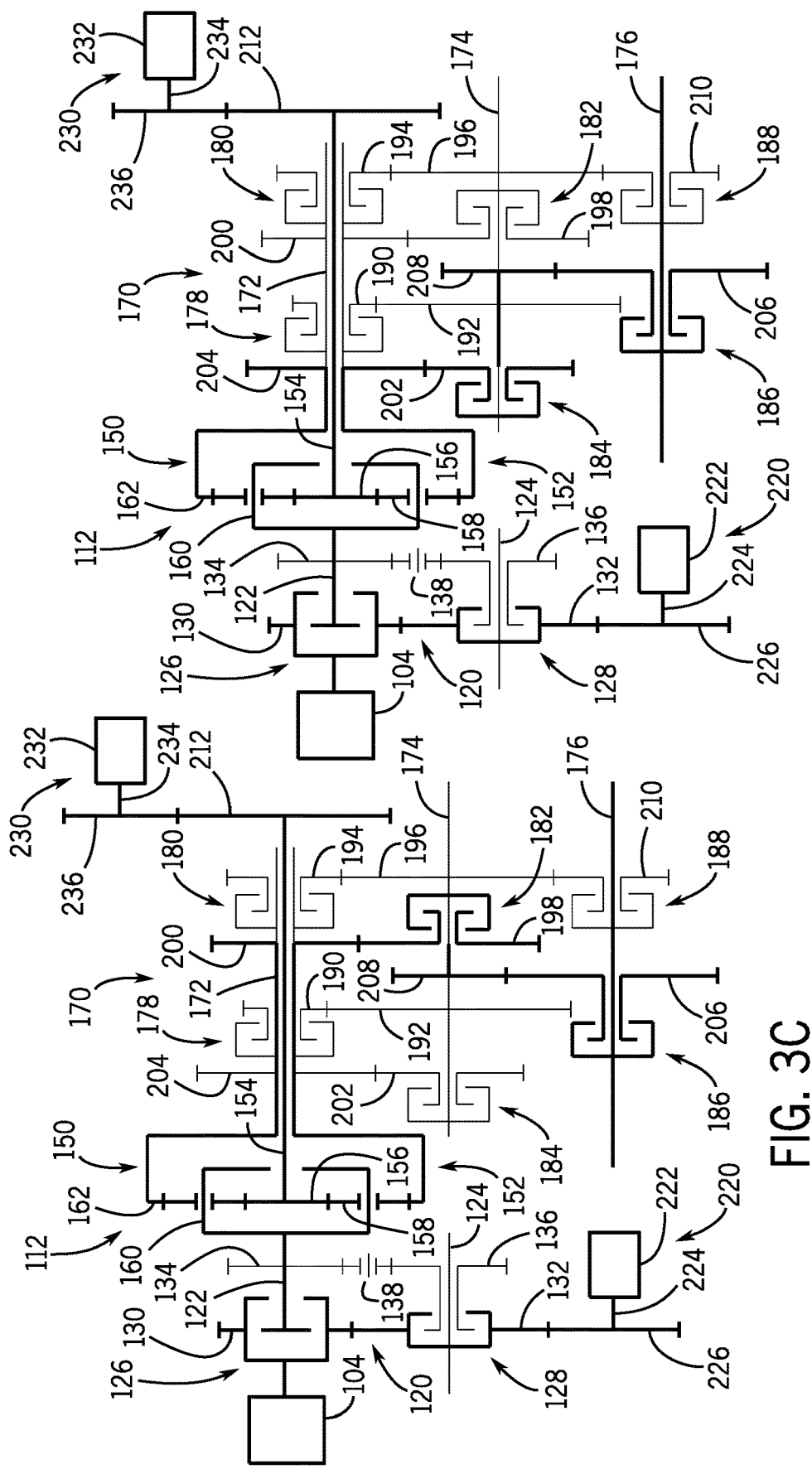

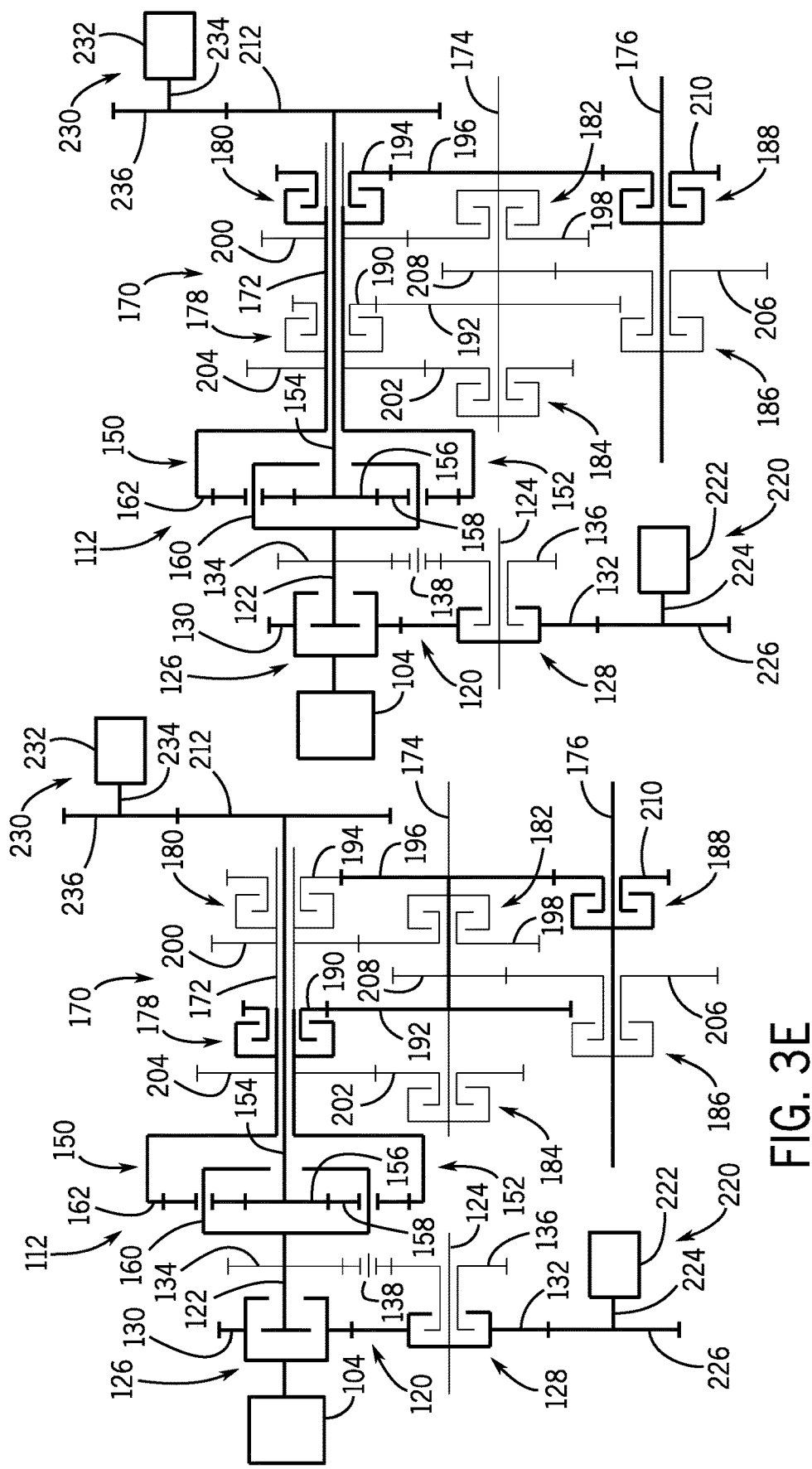

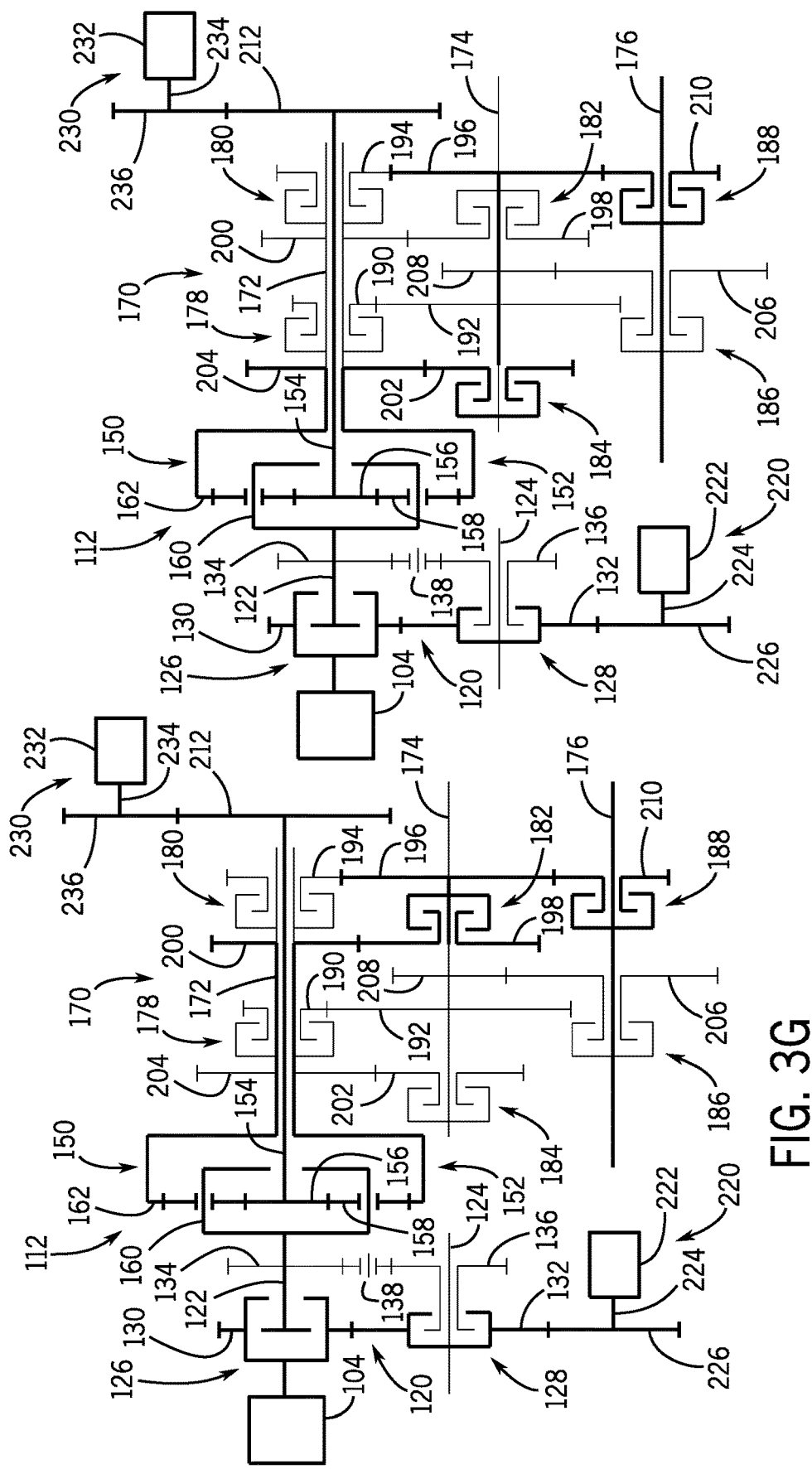

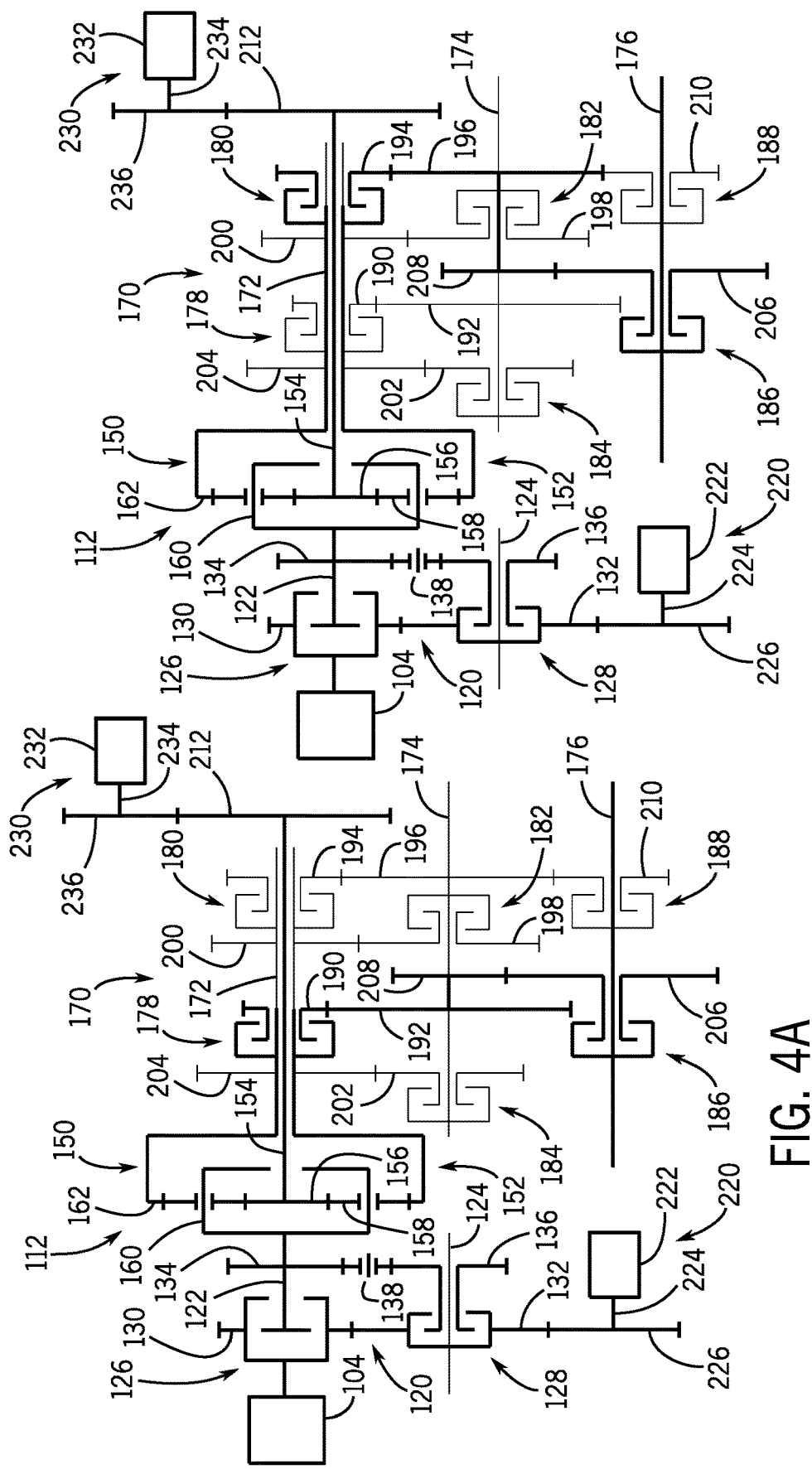

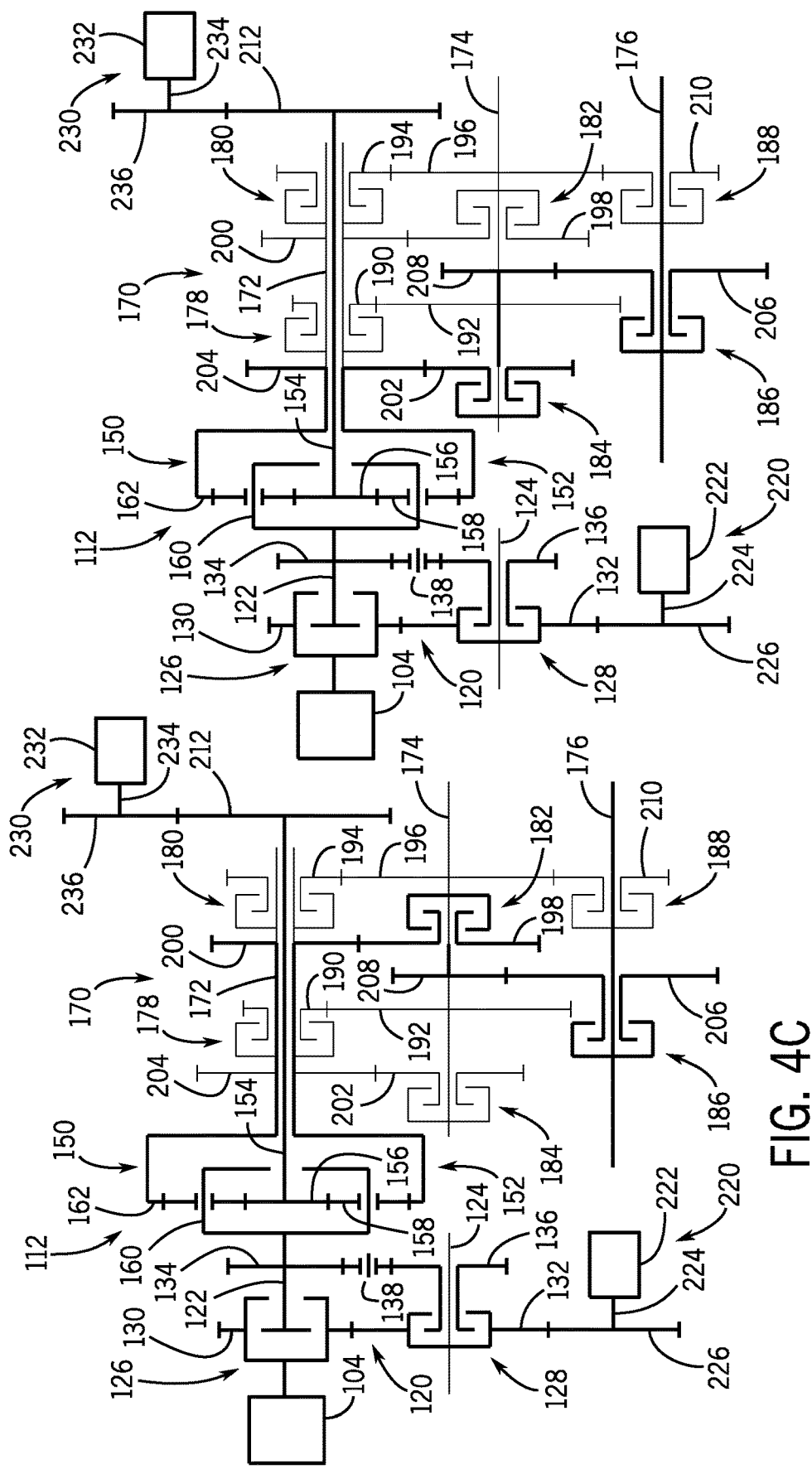

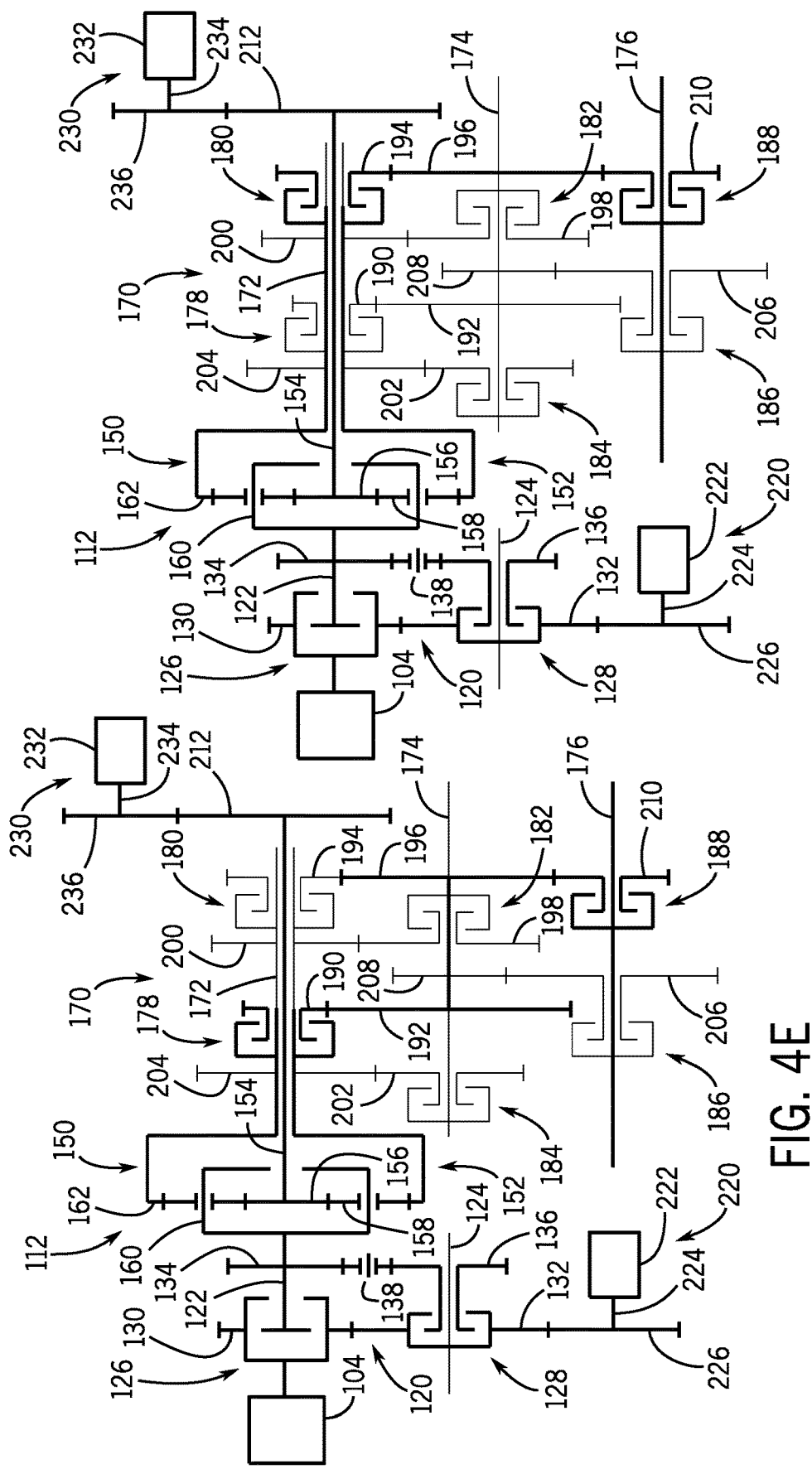

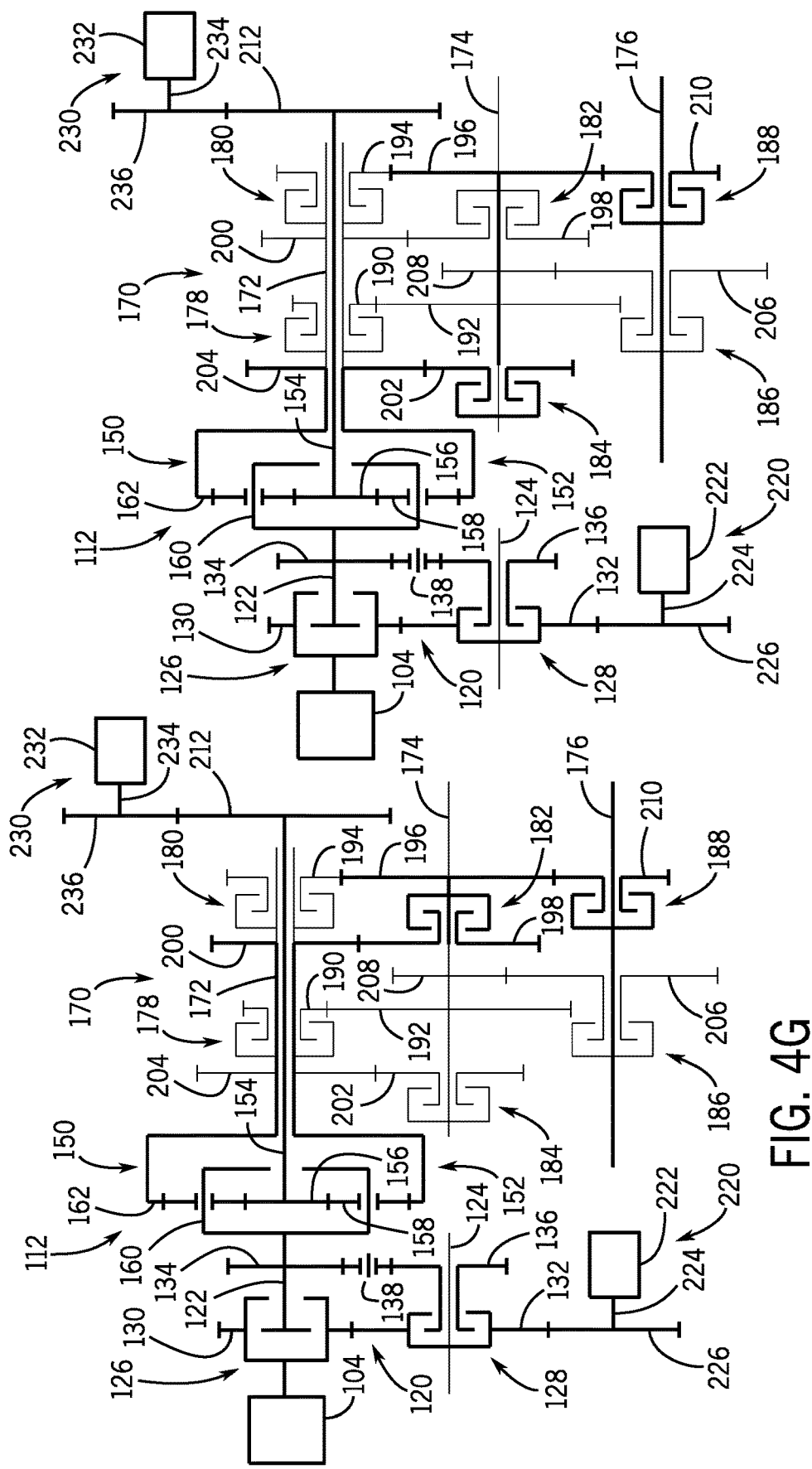

ELECTRONICALLY-VARIABLE POWER SHIFT TRANSMISSION FOR WORK VEHICLES

CROSS-REFERENCE TO RELATED APPLICATION(S)

Not applicable.

STATEMENT OF FEDERALLY SPONSORED RESEARCH OR DEVELOPMENT

Not applicable.

FIELD OF THE DISCLOSURE

This disclosure relates to transmission systems for work vehicles.

BACKGROUND OF THE DISCLOSURE

Work vehicles transmissions may incorporate continuously or infinitely variable power sources, such as electric machines or hydraulic drives, to supplement or supplant mechanical power from a primary power plant, such as a diesel engine, to provide tractive power to the machine through some or all of its travel range. Such transmissions may operate in multiple modes, including one or more modes using only conventional mechanical (e.g., engine) power or only supplemental (e.g., electric) power. Such transmissions may also incorporate planetary arrangements to combine the multiple power sources. The single or combined power is delivered to a gear ratio changing assembly to further effect different operational modes. From there, the power is delivered to various power sinks or other downstream components of the vehicle drivetrain (e.g., additional gear ratio changing assemblies, differential devices, final or other drives, ground-engaging wheels or tracks, and so on).

SUMMARY OF THE DISCLOSURE

The invention provides an electronically-variable power shift transmission for work vehicles.

Specifically, in one aspect the invention is a transmission for a work vehicle comprising an input assembly, an electric machine, a variator and a power shift assembly. The input assembly has directional clutches and is configured to receive rotational input power from an engine of the work vehicle. The variator only includes a single planetary set configured to receive and combine rotational input power from the electric machine and the input assembly. The power shift assembly is configured to receive the rotational input power from the variator and has speed gears, range gears, power shift clutches and an output shaft. The power shift clutches are configured to dissipate energy from asynchronous gear meshing with one of the power shift clutches being associated with each of the speed and range gears. The power shift assembly is configured to effect multiple different rotational power flows through to the output shaft that arise from meshing the speed and range gears at each shift of the power shift assembly to effect a unique one of multiple gear ratios.

In another aspect, the invention is a transmission for a work vehicle comprising an input assembly, an electric machine, a variator and a power shift assembly. The input assembly has directional clutches and is configured to receive rotational input power from an engine of the work vehicle. The variator includes only a single planetary set configured to receive rotational input power from the electric machine and the input assembly. The variator is configured to sum the rotational input power from the electric machine and the engine to provide a split-path rotational power. The power shift assembly is configured to receive the split-path rotational power from the variator and has speed gears, range gears, power shift clutches and an output shaft. The power shift clutches are configured to dissipate energy from asynchronous gear meshing with one of the power shift clutches being associated with each of the speed and range gears. The power shift assembly is configured to effect multiple different rotational power flows through to the output shaft that arise from meshing the speed and range gears at each shift of the power shift assembly to effect a unique one of multiple gear ratios. The power shift assembly has a substantially uniform gear ratio step delta for all shifts of the power assembly that varies by less than five percent.

The details of one or more embodiments are set-forth in the accompanying drawings and the description below. Other features and advantages will become apparent from the description, the drawings, and the claims.

BRIEF DESCRIPTION OF THE DRAWINGS

At least one example of the present disclosure will hereinafter be described in conjunction with the following figures:

FIGS. 3A-3H are schematic views of the multi-mode continuously variable power shift transmission of FIG. 2 depicting the power flows in various forward modes according to example embodiments of the present disclosure;

FIGS. 4A-4H are schematic views of the multi-mode continuously variable power shift transmission of FIG. 2 depicting the power flows in various reverse modes according to example embodiments of the present disclosure.

Figure 1:
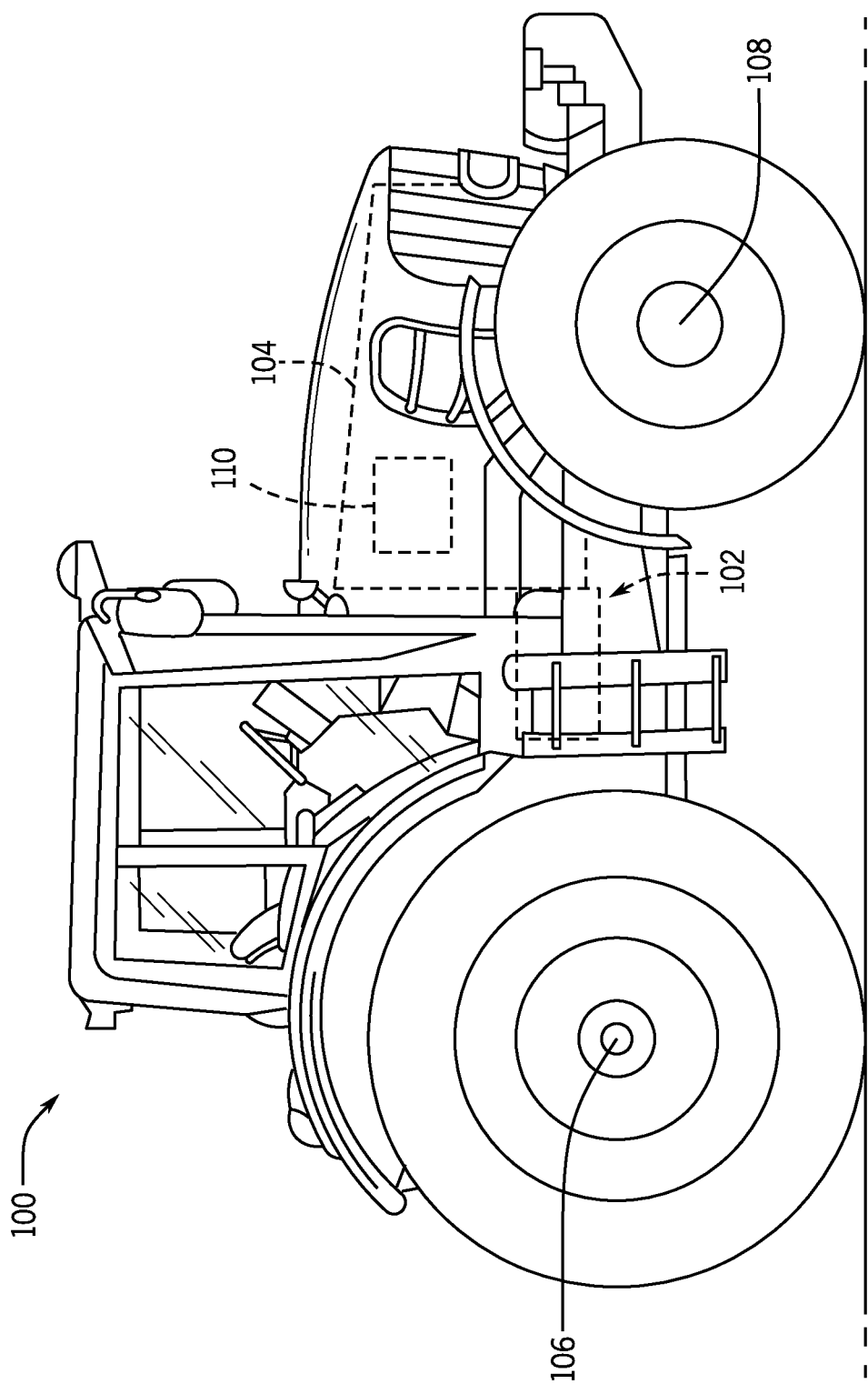
FIG. 1 schematically illustrates a work vehicle in the form of an agricultural tractor that may implement a variable power shift transmission, as illustrated in accordance with an example embodiment of the present disclosure.

Like reference symbols in the various drawings indicate like elements. For simplicity and clarity of illustration, descriptions and details of well-known features and techniques may be omitted to avoid unnecessarily obscuring the example and non-limiting embodiments of the invention described in the subsequent Detailed Description. It should further be understood that features or elements appearing in the accompanying figures are not necessarily drawn to scale unless otherwise stated.

DETAILED DESCRIPTION

Embodiments of the present disclosure are shown in the accompanying figures of the drawings described briefly above. Various modifications to the example embodiments may be contemplated by one of skill in the art without departing from the scope of the present invention, as set-forth in the appended claims.

Overview

As noted above, work vehicle transmissions may incorporate continuously or infinitely variable power sources, such as electric machines or hydraulic drives, to supplement or supplant mechanical power from a primary power plant, such as a diesel engine, to provide tractive power to the machine through some or all of its travel range. Such transmissions may operate in multiple modes, including one or more modes using only engine power or only electric power. Such transmissions may also incorporate planetary arrangements to combine the multiple power sources. The single or combined power is delivered to a gear ratio changing assembly to further effect different operational modes in which power is delivered to various power sinks or other downstream components of the vehicle drivetrain. Generally, in the discussion below, the term "engaged" refers to transmission components that are in positions to transfer power between the such components (e.g., enmeshed gears or frictionally engaged clutch portions); and the term "fixedly coupled" generally refers to transmission components that rotate with one another.

At present, conventional gear ratio changing assemblies employed with such transmissions may require synchronous shifts at specific shift points to effect different operational modes of the transmission. This reduces the flexibility of the drivetrain and limits the ability of the transmission control logic to effect a wide range of travel speeds while maintaining a single transmission gear ratio (i.e., without requiring up or down shifts). This limitation is not resolved by the use of downstream power shift gear ratio changing assembly. Further, power shift assemblies of conventional design may have a large-quantity components in the gear train, often including integer multiples of gears and clutches as compared to the resulting operational modes. This may come at significant cost and complexity, require one or more additional shifts for a given power band, and necessitate higher capacity components, especially the supplemental power sources. All of this may further impact and exacerbate space envelope constraints for a given work vehicle.

Disclosed herein is an electronically variable power shift transmission for work vehicles. The transmission includes as primary components a variator device, one or more continuously variable power sources, such as electric motors, and a power shift arrangement with gears and clutches capable of consuming energy from asynchronous shaft rotations. The power shift arrangement affords the flexibility of gear meshes without the need to synchronize the rotating shafts and also permits control strategies that vary the shift points between operating modes, and even to forego shifts entirely, thereby remaining in the same mode for ranges of speeds of the vehicle. The power shift assembly may provide for wide power bands, in certain cases allowing for the speed to double from the low to the high end of the power band in each mode.

An input assembly is provided for transferring mechanical rotating power from the engine to the variator in one or more modes of operation of the transmission. The input assembly may include one or more directional clutches (e.g., forward and reverse clutches). In various configurations, the transmission will provide multiple forward speeds and multiple reverse speeds. In one or more modes, the engine and electric power sources may also provide combined or summed ("split-path") power. Varying the electric machine varies the power band of the split-path operational modes, the engine may be running at constant speed and power. Generally, the electric machine may be a lower capacity motor, and thereby less costly, smaller and occupying less space, as compared to both electrified synchronous gear sets and conventional power shift gear sets, which may have a larger number of gear components and larger shift steps. Multiple electric machines may be utilized, such as a second electric motor tied to the engine (e.g., via the input assembly) used as a generator for powering the first electric machine.

In certain embodiments, the power shift assembly has a set of speed gears and a set of range gears, each of the gears being mounted on one of multiple parallel shafts or shaft elements. For example, the power shift assembly, and the transmission, may provide eight forward and eight reverse speed modes using four speed gears and two range gears. Other arrangements are contemplated, such as six forward and six reverse speed modes in a 3×2 architecture as well as nine forward and nine reverse speed modes in a 3×3 architecture. In each, the power shift assembly is configured with constrained steps, such as within one or two percent (including larger ranges such as five or ten percent), between modes (i.e., from one step or shift to the next). The gear ratios effected by the gears are closely constrained, such as near or within 2.0 between successive speed gears and between successive range gears.

In some embodiments, the transmission discussed herein may be considered a variable power shift transmission (vPST), as opposed to an infinitely variable transmission (IVT) or a traditional power shift transmission (PST). In some respects, the variable power shift transmission (vPST) may be considered a hybrid transmission that provides at least some of the benefits of the infinitely variable transmission (IVT) and a traditional power shift transmission (PST). In particular, the variable power shift transmission (vPST) may have six, eight, nine, or more split-path modes, in each direction, as compared to three or four split-path modes for an infinitely variable transmission (IVT), and provides the variability that may not otherwise be available in a traditional power shift transmission (PST). The additional modes provided by the variable power shift transmission (vPST) enables the use of relatively small electric machines than would otherwise be required for an infinitely variable transmission (IVT) with comparable capabilities.

Generally, the variable power shift transmission (vPST) is enabled by a variator with a single-row simple planetary gear set that operates to combine rotational inputs from an engine and an electric motor in order to provide the combined rotational inputs to a power shift assembly. The power shift assembly includes a number of power shift clutches configured to dissipate energy from asynchronous shaft rotations and associated shaft meshing. As introduced above, this combination provides a transmission with the benefits of both infinitely variable transmission (IVT) or a traditional power shift transmission (PST).

In further embodiments, the below-described transmission and variants thereof can be integrated into various types of work vehicle platforms, such as work vehicle vehicles employed within the agricultural, construction, forestry, and mining industries. Accordingly, the following description should be understood as merely establishing a non-limiting context in which embodiments of the present disclosure may be better understood.

Example Embodiments of an Electronically-Variable Power Shift Transmission for Work Vehicle As will become apparent from the discussion herein, the disclosed power shift transmission and associated powertrain may be used advantageously in a variety of settings and with a variety of machinery. For example, referring now to FIG. 1, an example of the disclosed transmission may be included in a work vehicle 100. In FIG. 1, the work vehicle 100 is depicted as a tractor with a powertrain 102 (shown schematically). It will be understood, however, that other configurations may be possible, including configurations with the vehicle 100 as a different kind of tractor, a harvester, a log skidder, a grader, or one of various other work vehicle types. It will further be understood that the disclosed powertrains may also be used in non-work vehicles and non-vehicle applications (e.g., fixed-location power installations).

Generally, the powertrain 102 may be configured to generate power and to transmit the power from an engine 104 and/or other power sources (discussed below) to an output member (e.g., an output shaft) via a variable power shift transmission (also discussed below). In some embodiments, such an output member of the powertrain 102 may transmit the power to a rear axle 106 and/or to a front axle 108 of the work vehicle 100. However, the powertrain 102 may also be configured for delivering power to a power take-off shaft that drives an implement that is supported on the work vehicle 100 or that is supported on a separate vehicle. It will be appreciated that the powertrain 102 may be configured for delivering power to other power sinks without departing from the scope of the present disclosure.

Although not discussed in detail, a controller 110 may facilitate operation of the powertrain 102 and/or work vehicle 100, either automatically or based on operator commands. Such operator commands may be generated upon operator interaction with a human-machine interface and various controls therein configured to receive input commands from the operator to control, for example, various electric or hydraulic systems associated with controlling the aforementioned components. The human-machine interface may be configured in a variety of ways and may include one or more joysticks, various switches or levers, one or more buttons, a touchscreen interface that may be overlaid on a display, a keyboard, a speaker, a microphone associated with a speech recognition system, or various other human-machine interface devices.

As an example, the controller 110 may facilitate operation of the transmission of the powertrain 102 into the various modes discussed in greater detail below, as well as other systems and components of the work vehicle 100 and any of the functions described herein. The controller 110 may be configured as computing devices with associated processor devices and memory architectures, as hydraulic, electrical or electro-hydraulic controllers, or otherwise. In one example, the controller 110 may be implemented with processing architecture such as a processor and memory, as well as suitable communication interfaces. For example, the controller 110 may implement functional modules or units with the processor based on programs or instructions stored in memory.

Figure 2:
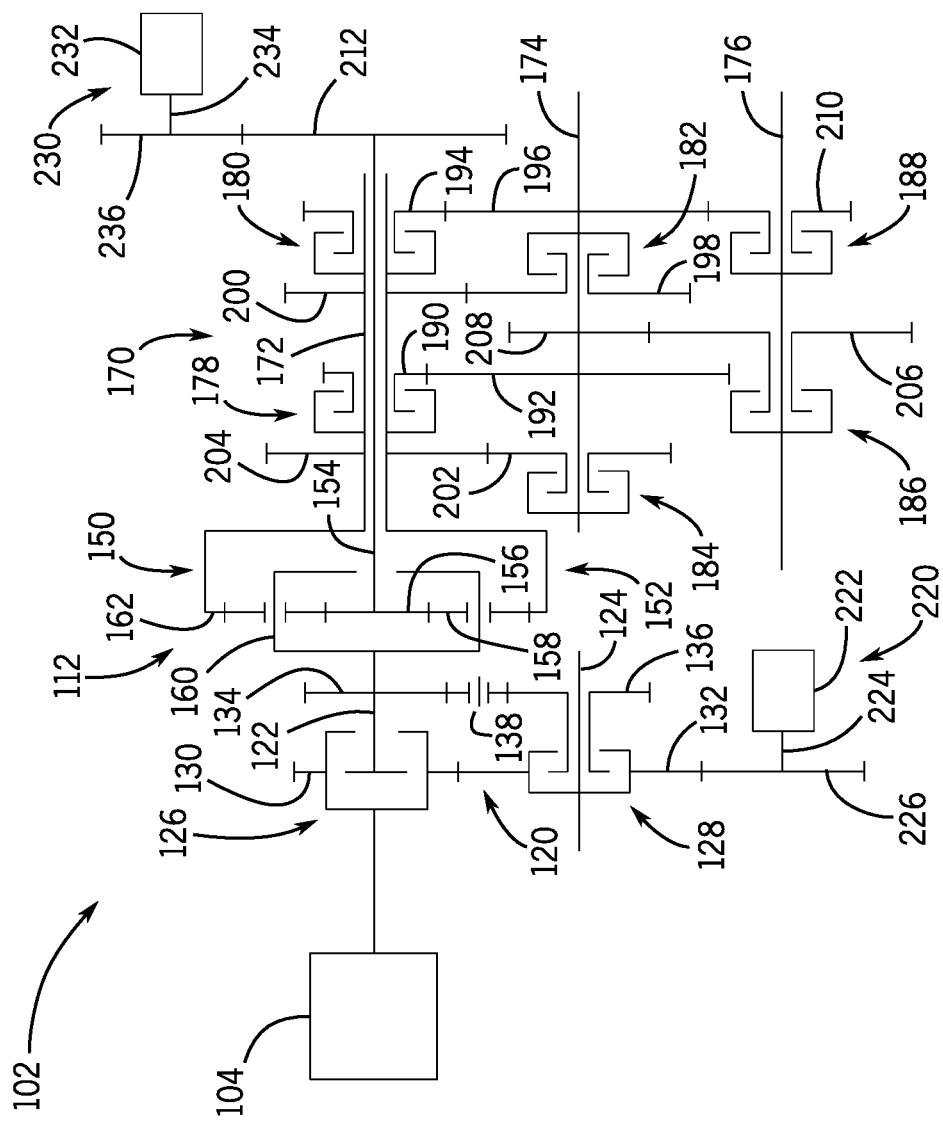
FIG. 2 is a schematic view of a multi-mode continuously variable power shift transmission of the work vehicle of FIG. 1 according to an example embodiment of the present disclosure.

Referring now to FIG. 2, an example configuration of the powertrain 102 is depicted schematically. The powertrain 102 may include the engine 104, which may be an internal combustion engine of various known configurations, and one or more continuously variable power (CVP) assemblies 220, 230. The powertrain 102 also includes a variable power shift transmission 112 that operates to transfer power between the engine 104, the CVP assemblies 220, 230, and one or more output shafts (e.g., output shaft 176). Each CVP assembly 220, 230 may include at least one continuously variable machine (CVM), such as an electrical machine or a hydraulic machine (e.g., CVMs 222, 232, discussed below).

Generally, the transmission 112 includes a plurality of components, such as shafts, gears, gear sets, clutches, brakes, and/or other components, that interconnect to enable the transfer of power amongst the engine 104, the first CVM 222, and/or the second CVM 232 to appropriately power the output shaft 176 and/or one or more other output members. The transmission 112 may be considered a continuously variable power shift transmission or an infinitely power shift variable transmission. Also, the transmission 112 may be configured to provide selection between one of numerous transmission modes, as discussed in greater detail below. In one or more modes, the engine and electric power sources may also provide combined or summed ("split-path") power. Varying the electric machine varies the power band of the split-path operational modes, the engine 304 may be running at constant speed and power. Although not discussed in greater detail below, the transmission 112 may also be operated in additional operational modes, including those effected solely from engine input power ("engine-only" power) or solely from electric machine input power ("series-electric" power). The single-source power may be routed through the transmission, without passing through the variator, for tractive or other use in the work vehicle in a number of discreet operational modes.

In one example, the output shaft 176 may form or may be directly connected to one or more power sinks (e.g., one or both axles 106, 108) of the work vehicle 100. An additional power output of the transmission 112 may be one or more power take-off ("PTO") shaft elements (not shown).

Generally, in some embodiments, the transmission may be considered to include an input assembly 120, a variator 150, and a power shift assembly 170. Although FIG. 2 depicts one example of a suitable transmission 112, the present disclosure is also applicable to other transmission arrangements and configurations.

In one example, the input assembly 120 is generally arranged to distribute power from the engine 104 to the first CVP assembly 220 and/or the variator 150. The input assembly 120 includes an input main shaft 122 and an input countershaft 124 that support a number of clutches 126, 128 and gears (or gear elements) 130, 132, 134, 136, 138. The clutches 126, 128 may be considered directional clutches in that the forward clutch 126 operates to drive the input main shaft 122 for the variator 150 in a forward (or first) direction, and the reverse clutch 128 operates to drive the input main shaft 122 for the variator 150 in a reverse (or second direction). Moreover, in the discussion below, the gears 130, 132, 134, 136, 138 may be referenced as the first gear 130, second gear 132, third gear 134, fourth gear 136, and fifth gear 138.

As shown, the forward clutch 126 may be considered to include a first portion (e.g., a first clutch plate) fixedly coupled to the input main shaft 122 and a second portion (e.g., a second clutch plate) fixedly coupled to an element that is engaged to the engine 104 such that the first and second portions of the forward clutch 126 may be selectively engaged to rotationally couple the engine 104 to the input main shaft 122 or selectively disengaged to rotationally decouple the engine 104 from to the main shaft 122. The second portion of the forward clutch 126 supports the first gear 130 that is engaged with the second gear 132 supported on an element of the reverse clutch 128.

The reverse clutch 128 has a first portion (e.g., a first clutch plate) that is fixedly coupled to an input stub shaft (or shaft element) that circumscribes the input countershaft 124 and supports the fourth gear 136 and a second portion (e.g., a second clutch plate) that is fixedly coupled to the input countershaft 124 and as noted supports the second gear 132. The fourth gear 136, fixedly coupled the first element of the reverse clutch 128, is rotationally coupled to the input main shaft 122 via the third gear 134 and the fifth (or idler) gear 138 enmeshed in between the third gear 134 and the fourth gear 136. As a result of this arrangement, upon engagement, the reverse clutch 128 may drive the input main shaft 122 in the reverse direction with power flowing from the engine 104, through the first gear 130 supported by the second element of the (unengaged) forward clutch 126, through the second gear 132, across the engaged reverse clutch 128, and through the fourth gear 136, the fifth (or idler) gear 138, and the third gear 134 fixedly mounted to the input main shaft 122. Upon disengagement of the reverse clutch 128, the input countershaft 124 is rotationally decoupled from the input main shaft 122.

Additionally, in this arrangement, the engine 104 may provide power to the first CVP assembly 220 through the input assembly 120. In particular, the second element of the reverse clutch 128 transfers power (via the first gear 130 and second gear 132) to the first CVP assembly 220. Additional details about the first CVP assembly 220 are provided below.

As introduced above, the transmission 112 further includes the variator 150 to condition the power from the engine 104 and the second CVP assembly 230. As noted above, the variator 150 is operably connected to the engine 104 via the input assembly 120. Generally, the variator 150 may include a variety of devices capable of summing the mechanical inputs from the engine 104 and the second CVP assembly 230 for individual or combined mechanical outputs to the power shift assembly 170.

In one example, the variator 150 includes a planetary gear set 152 and a variator shaft 154 about which the planetary gear set 152 is centered. In this example, the planetary gear set 152 is a single row planet set with a sun gear 156, a series of planet gears 158 supported on a carrier 160, and a ring gear 162. The sun gear 156 is fixedly coupled to the variator shaft 154, and the planet gears 158 may be enmeshed with and disposed between the sun gear 156 and the ring gear 162. As shown, the carrier 160 may function as an input member to transfer power from the input assembly 120 to the variator 150 via the input main shaft 122 in either direction; and the sun gear 156 may function as an input member to transfer power from the second CVP assembly 230 to the variator 150 via the variator shaft 154 and a sixth gear 212 mounted on the variator shaft 154 engaged with the second CVP assembly 230 in either direction. Moreover, the ring gear 162 may function as an output member of the variator 150 to transfer power to the power shift assembly 170.

In the disclosed examples, the variator 150 includes a single planetary gear set 152 (e.g., a single-row simple planetary gear set with a single sun gear 156, a single set or row of planet gears 158, a single carrier 160, and a single ring gear 162. This is in contrast to compound or multiple planetary gear sets 152 (e.g., with multiple meshed-planet gears in a planet train, stepped planet gears within a planet train, and/or multi-stage structures). The variator 150 with the single planetary gear set 152 provides a mechanism for combining multiple power flows as opposed to planetary gear set arrangements that may be primarily directed to speed reductions.

In one example, the power shift assembly 170 includes a power shift main shaft 172, a power shift countershaft 174, and the output shaft 176, introduced above. As discussed in greater detail below, the power shift main shaft 172 is fixedly coupled to receive power from and rotate with the ring gear 162 of the variator 150 and to provide power to the output shaft 176, either directly or through the power shift countershaft 174. The power shift assembly 170 further includes number of speed and range clutches 178, 180, 182, 184, 186, 188 and gears 190, 192, 194, 196, 198, 200, 202, 204, 206, 208, 210 to selectively transfer power between the shafts 172, 174, 176.

The power shift main shaft 172, in this example, circumscribes the variator shaft 154, although other examples may have other arrangements. The first and second speed clutches 178, 180 are generally supported about the power shift main shaft 172; the third and fourth speed clutches 182, 184 are generally supported about the power shift countershaft 174; and the first and second range clutches 186, 188 are generally supported about the output shaft 176.

As noted above, the power shift main shaft 172 is fixed to rotate with the ring gear 162 of the variator 150. The first speed clutch 178 has a first portion (e.g., a first clutch plate) coupled to a stub shaft (or shaft element) circumscribing power shift main shaft 172 and supporting a seventh gear 190 and a second portion (e.g., a second clutch plate) that is fixedly coupled to the power shift main shaft 172. The seventh gear 190 is engaged with an eighth gear 192 supported on the power shift countershaft 174. As such, upon engagement of the first speed clutch 178, the power shift main shaft 172 is rotationally coupled to the power shift countershaft 174 through the seventh and eighth gears 190, 192; and upon disengagement of the first speed clutch 178, the power shift main shaft 172 is rotationally decoupled relative to the power shift countershaft 174 at the first speed clutch 178.

The second speed clutch 180 has a first portion (e.g., a first clutch plate) coupled to a stub shaft (or shaft element) circumscribing power shift main shaft 172 and supporting a ninth gear 194 and a second portion (e.g., a second clutch plate) that is fixedly coupled to the power shift main shaft 172. The ninth gear 194 is engaged with a tenth gear 196 supported on the power shift countershaft 174. As such, upon engagement of the second speed clutch 180, the power shift main shaft 172 is rotationally coupled to the power shift countershaft 174 through the ninth and tenth gears 194, 196; and upon disengagement of the second speed clutch 180, the power shift main shaft 172 is rotationally decoupled relative to the power shift countershaft 174 at the second speed clutch 180.

The third speed clutch 182 has a first portion (e.g., a first clutch plate) coupled to a stub shaft (or shaft element) circumscribing power shift countershaft 174 and supporting an eleventh gear 198 and a second portion (e.g., a second clutch plate) that is fixedly coupled to the power shift countershaft 174. The eleventh gear 198 is engaged with a twelfth gear 200 supported on the power shift main shaft 172. As such, upon engagement of the third speed clutch 182, the power shift main shaft 172 and the power shift countershaft 174 are rotationally coupled together through the eleventh and twelfth gears 198, 200; and upon disengagement of the third speed clutch 182, the power shift main shaft 172 is rotationally decoupled relative to the power shift countershaft 174 at the third speed clutch 182.

The fourth speed clutch 184 has a first portion (e.g., a first clutch plate) coupled to a stub shaft (or shaft element) circumscribing power shift countershaft 174 and supporting a thirteenth gear 202 and a second portion (e.g., a second clutch plate) that is fixedly coupled to the power shift countershaft 174. The thirteenth gear 202 is engaged with a fourteenth gear 204 supported on the power shift main shaft 172. As such, upon engagement of the fourth speed clutch 184, the power shift main shaft 172 and the power shift countershaft 174 are rotationally coupled together through the thirteenth and fourteenth gears 202, 204; and upon disengagement of the fourth speed clutch 184, the power shift main shaft 172 is rotationally decoupled relative to the power shift countershaft 174 at the fourth speed clutch 184.

The first range clutch 186 has a first portion (e.g., a first clutch plate) coupled to a stub shaft (or shaft element) circumscribing output shaft 176 and supporting a fifteenth gear 206 and a second portion (e.g., a second clutch plate) that is fixedly coupled to the output shaft 176. The fifteenth gear 206 is engaged with a sixteenth gear 208 supported on the power shift countershaft 174. As such, upon engagement of the first range clutch 186, the power shift countershaft 174 and the output shaft 176 are rotationally coupled together through the fifteenth and sixteenth gears 206, 208; and upon disengagement of the first range clutch 186, the power shift countershaft 174 is rotationally decoupled relative to the output shaft 176 at the first range clutch 186.

The second range clutch 188 has a first portion (e.g., a first clutch plate) coupled to a stub shaft (or shaft element) circumscribing output shaft 176 and supporting a seventeenth gear 210 and a second portion (e.g., a second clutch plate) that is fixedly coupled to the output shaft 176. The seventeenth gear 210 is engaged with the tenth gear 196 supported on the power shift countershaft 174. As such, upon engagement of the second range clutch 188, the power shift countershaft 174 and the output shaft 176 are rotationally coupled together through the tenth and seventeenth gears 196, 210; and upon disengagement of the second range clutch 188, the power shift countershaft 174 is rotationally decoupled relative to the output shaft 176 at the second range clutch 188.

As introduced above, the first and second CVP assemblies 220, 230 are arranged to provide power to, or receive power from, other portions of the transmission 112. In one example, the first CVP assembly 220 is configured to receive power from the input assembly 120, and the second CVP assembly 230 is configured to provide power to the variator 150 to supplement (or replace) engine power. As shown, the first CVP assembly 220 includes a first CVM 222, a CVP shaft 224 extending form the first CVM 222, and a first CVP gear 226 mounted on the first CVP shaft 224; and the second CVP assembly 230 includes a second CVM 232, a second CVP shaft 234 extending form the second CVM 232, and a second CVP gear 236 mounted on the second CVP shaft 234. Generally, the first and second CVMs 222, 232 may be configured to convert power, e.g., from mechanical to electrical or hydraulic or vice versa. Various known control devices (not shown) may be provided to regulate such conversion, transmission, re-conversion and so on. As examples, the first and second CVMs 222, 232 may be electrical machines configured to operate as a motor (to output mechanical power from electrical input power) and as a generator (to output electrical power from mechanical input power). In one example configuration and depending on the operating region, the first CVM 222 is configured to function as a generator to generate electrical power from the mechanical inputs of the input assembly 120; and the second CVM 232 is configured to function as a motor to provide generate mechanical power to the variator 150 from electrical inputs (e.g., from batteries or the first CVM 222). As a further example and in other operating regions, the first CVM 222 may operator as a motor. In the particular configuration depicted in FIG. 2, the first CVP gear 226 is engaged with the second gear 132 mounted on the input countershaft 124 as a portion of the reverse clutch 128, thereby enabling the input assembly 120 to be rotationally coupled to first CVP assembly 220. Further in FIG. 2, the second CVP gear 236 is engaged with a sixth gear 212 mounted on the variator shaft 154, thereby enabling the second CVP assembly 230 to be rotationally coupled to the variator 150.

As noted above, the transmission 112 may be commanded to operate in various modes to provide suitable output power, conditioned at suitable torques and speeds at the output shaft 176. As described below, the transmission 112 may operate with eight forward modes and eight reverse modes in which the power from the engine 104 and second CVM 232 are combined (e.g., split power or split-path modes).

The first forward mode will now be discussed with reference to FIG. 3A, which is a schematic view of the transmission 112 of FIG. 2 with the power flow of the first forward mode highlighted. In the first forward mode, the forward clutch 126, the first speed clutch 178, and the first range clutch 186 are engaged, and the remaining clutches 128, 180, 182, 184, 188 are disengaged. As shown, the input assembly 120 receives the power from the engine 104, which flows through the forward clutch 126 to the variator 150 at the carrier 160 of the planetary gear set 152. Power from the engine 104 also flows through the second element of the reverse clutch 128 via gears 130, 132 to the first CVP assembly 220 via gears 132, 226, which operates to drive the CVM 222, thereby enabling generation of electrical power. Additionally, the variator 150 may receive power from the second CVP assembly 230 via gears 236, 212 and the variator shaft 154 at the sun gear 156. The power flows from the input assembly 120 and the second CVP assembly 230 are combined at the variator 150 in the planetary gear set 152 and output from the variator 150 via the ring gear 162 to the power shift assembly 170. The power flows into the power shift assembly 170 at the power shift main shaft 172, through the first speed clutch 178 to the power shift countershaft 174 via gears 190, 192, and from the power shift countershaft 174 across the first range clutch 186 to the output shaft 176 via gears 206, 208.

The second forward mode will now be discussed with reference to FIG. 3B, which is a schematic view of the transmission 112 of FIG. 2 with the power flow of the second forward mode highlighted. In the second forward mode, the forward clutch 126, the second speed clutch 180, and the first range clutch 186 are engaged, and the remaining clutches 128, 178, 182, 184, 188 are disengaged. As shown, the input assembly 120 receives the power from the engine 104, which flows through the forward clutch 126 to the variator 150 at the carrier 160 of the planetary gear set 152. Power from the engine 104 also flows through the second element of the reverse clutch 128 via gears 130, 132 to the first CVP assembly 220 via gears 132, 226, which operates to drive the CVM 222, thereby enabling generation of electrical power. Additionally, the variator 150 may receive power from the second CVP assembly 230 via gears 236, 212 and the variator shaft 154 at the sun gear 156. The power flows from the input assembly 120 and the second CVP assembly 230 are combined at the variator 150 in the planetary gear set 152 and output from the variator 150 via the ring gear 162 to the power shift assembly 170. The power flows into the power shift assembly 170 at the power shift main shaft 172, through the second speed clutch 180 to the power shift countershaft 174 via gears 194, 196, and from the power shift countershaft 174 across the first range clutch 186 to the output shaft 176 via gears 206, 208.

The third forward mode will now be discussed with reference to FIG. 3C, which is a schematic view of the transmission 112 of FIG. 2 with the power flow of the third forward mode highlighted. In the third forward mode, the forward clutch 126, the third speed clutch 182, and the first range clutch 186 are engaged, and the remaining clutches 128, 178, 180, 184, 188 are disengaged. As shown, the input assembly 120 receives the power from the engine 104, which flows through the forward clutch 126 to the variator 150 at the carrier 160 of the planetary gear set 152. Power from the engine 104 also flows through the second element of the reverse clutch 128 via gears 130, 132 to the first CVP assembly 220 via gears 132, 226, which operates to drive the CVM 222, thereby enabling generation of electrical power. Additionally, the variator 150 may receive power from the second CVP assembly 230 via gears 236, 212 and the variator shaft 154 at the sun gear 156. The power flows from the input assembly 120 and the second CVP assembly 230 are combined at the variator 150 in the planetary gear set 152 and output from the variator 150 via the ring gear to the power shift assembly 170. The power flows into the power shift assembly 170 at the power shift main shaft 172, through the third speed clutch 182 on the power shift countershaft 174 via gears 198, 200, and from the power shift countershaft 174 across the first range clutch 186 to the output shaft 176 via gears 206, 208.

The fourth forward mode will now be discussed with reference to FIG. 3D, which is a schematic view of the transmission 112 of FIG. 2 with the power flow of the fourth forward mode highlighted. In the fourth forward mode, the forward clutch 126, the fourth speed clutch 184, and the first range clutch 186 are engaged, and the remaining clutches 128, 178, 180, 182, 188 are disengaged. As shown, the input assembly 120 receives the power from the engine 104, which flows through the forward clutch 126 to the variator 150 at the carrier 160 of the planetary gear set 152. Power from the engine 104 also flows through the second element of the reverse clutch 128 via gears 130, 132 to the first CVP assembly 220 via gears 132, 226, which operates to drive the CVM 222, thereby enabling generation of electrical power. Additionally, the variator 150 may receive power from the second CVP assembly 230 via gears 236, 212 and the variator shaft 154 at the sun gear 156. The power flows from the input assembly 120 and the second CVP assembly 230 are combined at the variator 150 in the planetary gear set 152 and output from the variator 150 via the ring gear 162 to the power shift assembly 170. The power flows into the power shift assembly 170 at the power shift main shaft 172, through the fourth speed clutch 184 on the power shift countershaft 174 via gears 202, 204, and from the power shift countershaft 174 across the first range clutch 186 to the output shaft 176 via gears 206, 208.

The fifth forward mode will now be discussed with reference to FIG. 3E, which is a schematic view of the transmission 112 of FIG. 2 with the power flow of the fifth forward mode highlighted. In the fifth forward mode, the forward clutch 126, the first speed clutch 178, and the second range clutch 188 are engaged, and the remaining clutches 128, 180, 182, 184, 186 are disengaged. As shown, the input assembly 120 receives the power from the engine 104, which flows through the forward clutch 126 to the variator 150 at the carrier 160 of the planetary gear set 152. Power from the engine 104 also flows through the second element of the reverse clutch 128 via gears 130, 132 to the first CVP assembly 220 via gears 132, 226, which operates to drive the CVM 222, thereby enabling generation of electrical power. Additionally, the variator 150 may receive power from the second CVP assembly 230 via gears 236, 212 and the variator shaft 154 at the sun gear 156. The power flows from the input assembly 120 and the second CVP assembly 230 are combined at the variator 150 in the planetary gear set 152 and output from the variator 150 via the ring gear 162 to the power shift assembly 170. The power flows into the power shift assembly 170 at the power shift main shaft 172, through the first speed clutch 178 to the power shift countershaft 174 via gears 190, 192, and from the power shift countershaft 174 across the second range clutch 188 to the output shaft 176 via gears 196, 210.

The sixth forward mode will now be discussed with reference to FIG. 3F, which is a schematic view of the transmission 112 of FIG. 2 with the power flow of the sixth forward mode highlighted. In the sixth forward mode, the forward clutch 126, the second speed clutch 180, and the second range clutch 188 are engaged, and the remaining clutches 128, 178, 182, 184, 186 are disengaged. As shown, the input assembly 120 receives the power from the engine 104, which flows through the forward clutch 126 to the variator 150 at the carrier 160 of the planetary gear set 152. Power from the engine 104 also flows through the second element of the reverse clutch 128 via gears 130, 132 to the first CVP assembly 220 via gears 132, 226, which operates to drive the CVM 222, thereby enabling generation of electrical power. Additionally, the variator 150 may receive power from the second CVP assembly 230 via gears 236, 212 and the variator shaft 154 at the sun gear 156. The power flows from the input assembly 120 and the second CVP assembly 230 are combined at the variator 150 in the planetary gear set 152 and output from the variator 150 via the ring gear 162 to the power shift assembly 170. The power flows into the power shift assembly 170 at the power shift main shaft 172, through the second speed clutch 180 to the power shift countershaft 174 via gears 194, 196, and from power shift countershaft 174 across the second range clutch 188 to the output shaft 176 via gears 196, 210.

The seventh forward mode will now be discussed with reference to FIG. 3G, which is a schematic view of the transmission 112 of FIG. 2 with the power flow of the seventh forward mode highlighted. In the seventh forward mode, the forward clutch 126, the third speed clutch 182, and the second range clutch 188 are engaged, and the remaining clutches 128, 178, 180, 184, 186 are disengaged. As shown, the input assembly 120 receives the power from the engine 104, which flows through the forward clutch 126 to the variator 150 at the carrier 160 of the planetary gear set 152. Power from the engine 104 also flows through the second element of the reverse clutch 128 via gears 130, 132 to the first CVP assembly 220 via gears 132, 226, which operates to drive the CVM 222, thereby enabling generation of electrical power. Additionally, the variator 150 may receive power from the second CVP assembly 230 via gears 236, 212 and the variator shaft 154 at the sun gear 156. The power flows from the input assembly 120 and the second CVP assembly are combined at the variator 150 in the planetary gear set 152 and output from the variator 150 via the ring gear 162 to the power shift assembly 170. The power flows into the power shift assembly 170 at the power shift main shaft 172, through the third speed clutch 182 at the power shift countershaft 174 via gears 198, 200, and from the power shift countershaft 174 across the second range clutch 188 to the output shaft 176 via gears 196, 210.

The eighth forward mode will now be discussed with reference to FIG. 3H, which is a schematic view of the transmission 112 of FIG. 2 with the power flow of the first forward mode highlighted. In the eighth forward mode, the forward clutch 126, the fourth speed clutch 184, and the second range clutch 188 are engaged, and the remaining clutches 128, 178, 180, 182, 186 are disengaged. As shown, the input assembly 120 receives the power from the engine 104, which flows through the forward clutch 126 to the variator 150 at the carrier 160 of the planetary gear set 152. Power from the engine 104 also flows through the second element of the reverse clutch 128 via gears 130, 132 to the first CVP assembly 220 via gears 132, 226, which operates to drive the CVM 222, thereby enabling generation of electrical power. Additionally, the variator 150 may receive power from the second CVP assembly 230 via gears 236, 212 and the variator shaft 154 at the sun gear 156. The power flows from the input assembly 120 and the second CVP assembly 230 are combined at the variator 150 in the planetary gear set 152 and output from the variator 150 via the ring gear 162 to the power shift assembly 170. The power flows into the power shift assembly 170 at the power shift main shaft 172, through the fourth speed clutch 184 at the power shift countershaft 174 via gears 202, 204, and from the power shift countershaft 174 across the second range clutch 188 to the output shaft 176 via gears 196, 210.

Generally, the reverse modes have the same clutch configurations and overall power flows as the forward modes, except that the reverse clutch 128 is engaged instead of the forward clutch 126 in each of the respective modes to reverse the rotational direction. For example, in the first reverse mode, the reverse clutch 128, the first speed clutch 178, and the first range clutch 186 are engaged, and the remaining clutches 126, 180, 182, 184, 188 are disengaged. As such, in the first reverse mode and as reflected in FIG. 4A, the input assembly 120 receives the power from the engine 104, which flows through the reverse clutch 128, via gears 130, 132, 136, 138, 134 to the variator 150 at the carrier 160 of the planetary gear set 152. Power from the engine 104 also flows through the second element of the reverse clutch 128 via gears 130, 132 to the first CVP assembly 220 via gears 130, 132, 226, which operates to drive the CVM 222, thereby enabling generation of electrical power. Additionally, the variator 150 may receive power from the second CVP assembly 230 via gears 236, 212 and the variator shaft 154 at the sun gear 156. The power flows from the input assembly 120 and the second CVP assembly 230 are combined at the variator 150 in the planetary gear set 152 and output from the variator 150 via the ring gear 162 to the power shift assembly 170. The power flows into the power shift assembly 170 at the power shift main shaft 172, through the first speed clutch 178 to the power shift countershaft 174 via gears 190, 192, and from the power shift countershaft 174 across the first range clutch 186 to the output shaft 176 via gears 206, 208. The remaining reverse modes are depicted in FIGS. 4B-4H and have power flows similar to those in FIGS. 3B-3H, respectively, except the engagement of the reverse clutch 128 instead of the forward clutch 126.

As such, the transmission 112 noted above provides eight forward modes and eight reverse modes in an arrangement that incorporates CVMs 222, 232, particularly motors that may provide savings with respect to cost and space. The transmission 112 accomplishes this with a power shift assembly 170 that has more flexibility with shifts between modes as compared with synchronous transmissions. Although the clutches 178, 180, 182, 184, 186, 188 of the power shift assembly 170 have some ability to absorb energy from gears at different speeds, the power shift assembly 170 described herein provides an architecture with smaller and more consistent steps between shifts, as well as with fewer gears and clutches than conventional power shift arrangements. In support, the example ratios of the various modes for the transmission 112 are listed in Table (1) below:

TABLE 1

| Mode (Forward and Reverse) | Speed Clutch Ratio | Range Clutch Ratio | Overall Ratio | % Ratio Step Delta |
|---|---|---|---|---|
| First | 2.323 | 2.290 | 5.320 | |
| Second | 1.763 | 2.290 | 4.036 | 31.8% |
| Third | 1.339 | 2.290 | 3.065 | 31.7% |
| Fourth | 1.015 | 2.290 | 2.324 | 31.9% |
| Fifth | 2.323 | 0.812 | 1.886 | 23.2% |
| Sixth | 1.763 | 0.812 | 1.431 | 31.8% |
| Seventh | 1.339 | 0.812 | 1.087 | 31.7% |
| Eighth | 1.015 | 0.812 | 0.824 | 31.9% |

As shown, the power shift assembly 170 provides a configuration with uniform or near-uniform steps (e.g., in overall or absolute terms from step to step), such as within one or two percent, between modes (e.g., from one step or shift to the next, as reflected by comparisons between consecutive % Ratio Step Delta values of Table (1)). Generally, examples described herein may provide a power shift assembly with a gear ratio step delta that varies by less than ten percent, although in some examples, the gear ratio step delta may vary by less than five percent, including such values for all shifts and/or for consecutive shifts The gear ratios effected by the gears are closely constrained, such as near or within 2.0 between successive speed gears and between successive range gears (e.g., from one step or shift to the next, as reflected by comparisons between consecutive Overall Ratio values of Table (1)). The closely constrained shift steps reduce or avoid large torque spikes between operating modes, which, as noted above, aids in reducing the requirements of the electric machines. As such, the transmission 112 provides electric machines (e.g., CVMs 222, 232) and power shift clutches (e.g., clutches 178, 180, 182, 184, 186, 188) in a power shift assembly 170 that provides shifts within desired step values.

Figure 5:
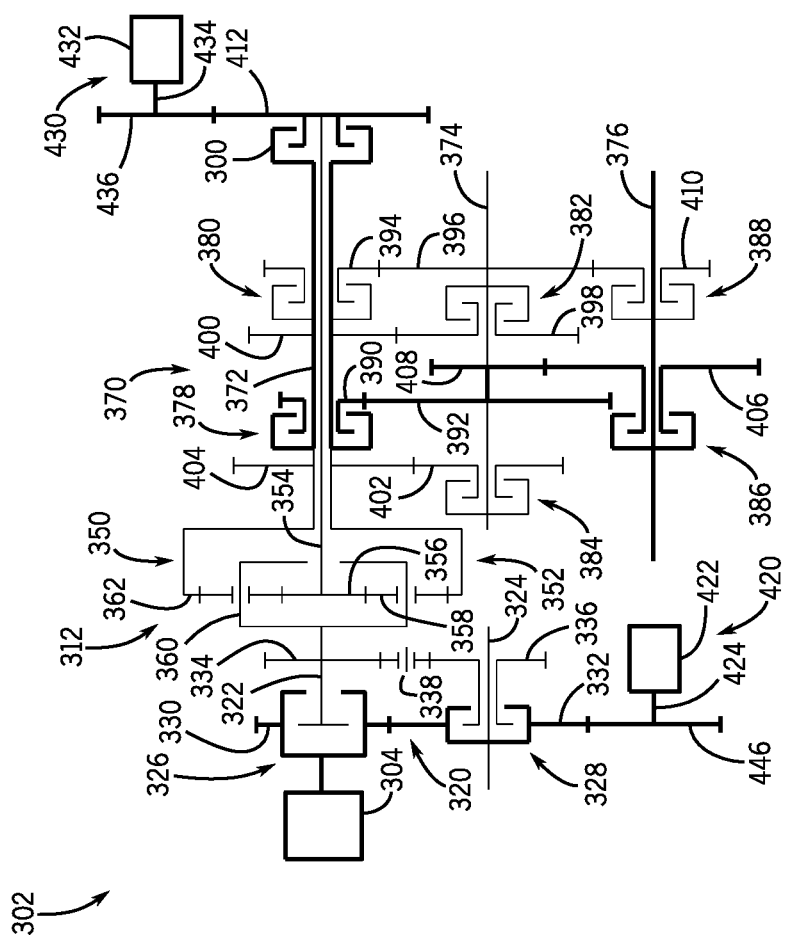
FIG. 5 is a schematic view of a further multi-mode continuously variable power shift transmission that may be implemented in the work vehicle of FIG. 1 according to an example embodiment of the present disclosure.

As noted above, the present disclosure may be applied to a number of different arrangements. One such alternate arrangement may include a powertrain 302 that is depicted schematically in FIG. 5 and may be implemented into the work vehicle 100 (FIG. 1) discussed above. Unless otherwise noted, the powertrain 302 may operate as discussed above with reference to FIGS. 2, 3A-3H, and 4A-4H. As shown, and as above, the powertrain 302 may include an engine 304, which may be an internal combustion engine of various known configurations, and one or more continuously variable power (CVP) assemblies 420, 430. The powertrain 302 also includes a variable power shift transmission 312 that operates to transfer power between the engine 304, the CVP assemblies 420, 430, and one or more output shafts (e.g., output shaft 376). Each CVP assembly 420, 430 may include at least one continuously variable machine (CVM), such as an electrical machine or a hydraulic machine (e.g., CVMs 422, 432, discussed below).

Generally, the transmission 312 includes a plurality of components, such as shafts, gears, gear sets, clutches, brakes, and/or other components, that interconnect to enable the transfer power amongst the engine 304, the first CVM 422, and/or the second CVM 432 to appropriately power the output shaft 376 and/or one or more other output members. The transmission 312 may be considered a continuously variable power shift transmission or an infinitely power shift variable transmission. Also, the transmission 312 may be configured to provide selection between one of numerous transmission modes, as discussed in greater detail below. In one or more modes, the engine and electric power sources may also provide combined or summed ("split-path") power. Varying the electric machine varies the power band of the split-path operational modes, the engine 304 may be running at constant speed and power. The transmission 312 may also be operated in additional operational modes effected solely from engine input power ("engine-only" power) or solely from electric machine input power ("series-electric" power). As discussed in greater detail below, the single-source power, particularly in the series-electric mode, may be routed through the transmission 312, without passing through the a variator (e.g., variator 350), for tractive or other use in the work vehicle in a number of discreet operational modes.

Generally, in some embodiments, the transmission may be considered to include an input assembly 320, a variator 350, and a power shift assembly 370. As above, the input assembly 320 is generally arranged to distribute power from the engine 304 to the first CVP assembly 420 and/or the variator 350. The input assembly 320 includes an input main shaft 322 and an input countershaft 324 that support a number of clutches 326, 328 and gears (or gear elements) 330, 332, 334, 336, 338.

The clutches 326, 328 may be considered directional clutches in that the forward clutch 326 operates to selectively drive the input main shaft 322 for the variator 150 in a forward (or first) direction, and the reverse clutch 328 operates to drive the input main shaft 322 for the variator 350 in a reverse (or second direction), in a manner similar to that discussed above with reference to FIG. 2.

In particular, the forward clutch 326 may be considered to include a first portion (e.g., a first clutch plate) fixedly coupled to the input main shaft 322 and a second portion (e.g., a second clutch plate) fixedly coupled to an element that is engaged to the engine 304 such that the first and second portions of the forward clutch 326 may be selectively engaged to rotationally couple the engine 304 to the input main shaft 322 or selectively disengaged to rotationally decouple the engine 304 from to the main shaft 322. The second portion of the forward clutch 326 supports the first gear 330 that is engaged with the second gear 332 supported on an element of the reverse clutch 328. The reverse clutch 328 has a first portion (e.g., a first clutch plate) that is fixedly coupled to an input stub shaft (or shaft element) that circumscribes the input countershaft 324 and supports the fourth gear 336 and a second portion (e.g., a second clutch plate) that is fixedly coupled to the input countershaft 324 and as noted supports the second gear 332. The fourth gear 336, fixedly coupled the first element of the reverse clutch 328, is rotationally coupled to the input main shaft 322 via the third gear 334 and the fifth (or idler) gear 338 enmeshed in between the third gear 334 and the fourth gear 336. As a result of this arrangement, upon engagement, the reverse clutch 328 may drive the input main shaft 322 in the reverse direction with power flowing from the engine 304, through the first gear 330 supported by the second element of the (unengaged) forward clutch 326, through the second gear 332, across the engaged reverse clutch 328, and through the fourth gear 336, the fifth (or idler) gear 338, and the third gear 334 fixedly mounted to the input main shaft 322. Upon disengagement of the reverse clutch 328, the input countershaft 324 is rotationally decoupled from the input main shaft 322.

Additionally, in this arrangement, the engine 304 may provide power to the first CVP assembly 420 through the input assembly 320. In particular, the second element of the reverse clutch 328 transfers power (via the first gear 330 and second gear 332) to the first CVP assembly 420. Additional details about the first CVP assembly 250 are provided below.

As introduced above, the transmission 312 further includes the variator 350 to condition the power from the engine 304 and the second CVP assembly 430. As noted above, the variator 350 is operably connected to the engine 304 via the input assembly 320. Additionally, the variator 350 is coupled to the second CVP assembly 430 via a clutch 300, which may be referred to as a "creeper" clutch 300. Generally, the variator 350 may include a variety of devices capable of summing the mechanical inputs from the engine 304 and the second CVP assembly 430 for individual or combined mechanical outputs to the power shift assembly 370.

In one example, the variator 350 includes a planetary gear set 352 and a variator shaft 354 about which the planetary gear set 352 is centered. As above, the variator 350 includes a single-row simple planetary gear set 352 that operates to combine the rotational inputs. In this example, the planetary gear set 352 is a single row planet set with a sun gear 356, a series of planet gears 358 supported on a carrier 360, and a ring gear 362. The sun gear 356 is fixedly coupled to the variator shaft 354, and the planet gears 358 may be enmeshed with and disposed between the sun gear 356 and the ring gear 362. As shown, the carrier 360 may function as an input member to transfer power from the input assembly 320 to the variator 350 via the input main shaft 322 in either direction; and the sun gear 356 may selectively function as an input member to transfer power from the second CVP assembly 430 to the variator 350 via the variator shaft 354 and a sixth gear 412 mounted on the variator shaft 354 engaged with the second CVP assembly 430 in either direction. Moreover, the ring gear 362 may function as an output member of the variator 350 to transfer power to the power shift assembly 370.

In one example, the power shift assembly 370 includes a power shift main shaft 372, a power shift countershaft 374, and the output shaft 376, introduced above. As discussed in greater detail below, the power shift main shaft 372 is fixedly coupled to receive power from and rotate with the ring gear 362 of the variator 350 and to provide power to the output shaft 376, either directly or through the power shift countershaft 374. The power shift assembly 370 further includes number of speed and range clutches 378, 380, 382, 384, 386, 388 and gears 390, 392, 394, 396, 398, 400, 402, 404, 406, 408, 410 to selectively transfer power between the shafts 372, 374, 376. Generally, the power shift assembly 370, including the speed and range clutches 378, 380, 382, 384, 386, 388 and gears 390, 392, 394, 396, 398, 400, 402, 404, 406, 408, 410 operate in a manner similar to the power shift assembly 170 discussed above.

Briefly, as above, the first and second CVP assemblies 420, 430 are arranged to provide power to, or receive power from, other portions of the transmission 312. In one example, the first CVP assembly 420 is configured to receive power from the input assembly 320, and the second CVP assembly 430 is configured to provide power to the variator 350 and/or power shift assembly 370 to supplement (or replace) engine power. As shown, the first CVP assembly 420 includes a first CVM 422, a CVP shaft 424 extending form the first CVM 422, and a first CVP gear 426 mounted on the first CVP shaft 424; and the second CVP assembly 430 includes a second CVM 432, a second CVP shaft 434 extending form the second CVM 432, and a second CVP gear 436 mounted on the second CVP shaft 434. Generally, the first and second CVMs 422, 432 may be configured to convert power, e.g., from mechanical to electrical or hydraulic or vice versa. Various known control devices (not shown) may be provided to regulate such conversion, transmission, re-conversion and so on. As examples, the first and second CVMs 422, 432 may be electrical machines configured to operate as a motor (e.g., to output mechanical power from electrical input power) and as a generator (to output electrical power from mechanical input power). In one example configuration, the first CVM 422 is configured to function as a generator to generate electrical power from the mechanical inputs of the input assembly 420; and the second CVM 432 is configured to function as a motor to provide generate mechanical power to the variator 350 and/or power shift assembly 370 from electrical inputs (e.g., from batteries or the first CVM 422).

As above, the power shift assembly 370 may be driven by engine 304 via the variator 350, particularly at the ring gear 362 of the variator 350, upon engagement of the one of the directional clutches 326, 328. As also noted above, the power from the second CVP assembly 430 may be combined with the power from the engine 304 within the variator 350 via an input to the variator 350 at the variator shaft 354 and the sun gear 356.

Moreover, in this particular example, the second CVP assembly 430 may selectively provide an isolated input to the power shift assembly 370, independently of the variator 350. In particular, the creeper clutch 300 may be engaged such that power from the second CVP assembly 430 is directed, via gear 412, across the creeper clutch 300 to the power shift main shaft 372 in one or more series-electric modes; and upon disengagement of the creeper clutch 300, the power from the second CVP assembly 430 is directed to the variator 350 as noted above for combination with engine power in one or more of split-path modes.

In this example, the transmission 312 is configured to operate in the split-path modes in a manner similar to those discussed above in reference to FIGS. 3A-3H and 4A-4H. In other words, the combinations of the various clutches 326, 328, 378, 380, 382, 384, 386, 388 are selectively engaged to combine power from the engine 304 and from the second CVP assembly 430 in the variator 350 and subsequently condition the power within the power shift assembly 370 to output the combined and conditioned power at the output shaft 376.

Further, the transmission 312 is configured to operate in one or more series-electric modes in which the power shift assembly 370 is powered only by the second CVP assembly 430. The power flow for such a series-electric mode is highlighted in FIG. 5. As shown, the creeper clutch 300 is engaged with one of the speed clutches (e.g., clutch 378, in this example) and one of the range clutches (e.g., clutch 386, in this example). With this configuration, power flows from the second CVP assembly 430, across the creeper clutch 300 to the power shift main shaft 372, across the first speed clutch 378, over the countershaft 374, and across the first range clutch 386 to the output shaft 376, thereby providing a relatively low speed, electric only option. The direction of the output shaft 376 may be reversed by reversing the direction of the second CVM 432.

As such, the transmission 312 noted above provides eight forward split-path modes, eight reverse split-path modes, and one or more series-electric modes in an arrangement that incorporates CVMs 422, 432, particularly motors that may provide savings with respect to cost and space.

ENUMERATED EXAMPLES

The following examples of transmission for a work vehicle are further provided and numbered for ease of reference.

1. A transmission for a work vehicle including: an input assembly having directional clutches and configured to receive rotational input power from an engine of the work vehicle; an electric machine; a variator including only a single planetary set configured to receive and combine rotational input power from the electric machine and the input assembly; a power shift assembly configured to receive the rotational input power from the variator, the power shift assembly comprising: speed gears; range gears; power shift clutches configured to dissipate energy from asynchronous gear meshing, one of the power shift clutches being associated with each of the speed and range gears; and an output shaft; wherein the power shift assembly is configured to effect multiple different rotational power flows through to the output shaft that arise from meshing the speed and range gears at each shift of the power shift assembly to effect a unique one of multiple gear ratios.

2. The transmission of example 1, wherein the power shift assembly has a gear ratio step delta for all shifts of the power assembly that varies by less than ten percent.

3. The transmission of example 1, wherein the power shift assembly has a gear ratio step delta for all shifts of the power assembly that varies by less than five percent.

4. The transmission of example 1, wherein each consecutive shift of the power shift assembly has a gear ratio step delta that varies by less than ten percent.

5. The transmission of example 1, wherein each consecutive shift of the power shift assembly has a gear ratio delta of less than 2.0.

6. The transmission of example 1, wherein the speed gears effect gear ratios that vary by less than 2.0 from one another and the range gears effect gear ratios that vary by less than 2.0 from one another.

7. The transmission of example 1, wherein the power shift assembly to configured to provide exactly eight split-path speed modes using only four speed gears and only two range gears, the split-path speed modes having combined power from the engine and the electric machine.

8. The transmission of example 1, wherein variator, speed gears and range gears are carried on parallel shafts that are employed to effect each of the multiple different rotational power flows.

9. The transmission of example 8, wherein the planetary set includes a carrier, a sun gear and a ring gear; wherein the sun gear is configured to receive rotational input power from the electric machine; wherein the carrier is configured to receive rotational input power from the engine through the input assembly; and wherein the ring gear provides rotational input power to the power shift assembly.

10. The transmission of example 1, further including a further electric machine being rotational tied to the engine through the input assembly and configured to receive rotational input power from the engine.

11. A transmission for a work vehicle including: an input assembly having directional clutches and configured to receive rotational input power from an engine of the work vehicle; an electric machine; a variator only including a single planetary set configured to receive rotational input power from the electric machine and the input assembly, the variator configured to sum the rotational input power from the electric machine and the engine to provide a split-path rotational power; a power shift assembly configured to receive the split-path rotational power from the variator, the power shift assembly comprising: speed gears; range gears; power shift clutches configured to dissipate energy from asynchronous gear meshing, one of the power shift clutches being associated with each of the speed and range gears; and an output shaft; wherein the power shift assembly is configured to effect multiple different rotational power flows at different gear ratios through to the output shaft that arise from meshing the speed and range gears at each shift of the power shift assembly to effect a unique one of multiple gear ratios.

12. The transmission of example 12, wherein the power shift assembly has a gear ratio step delta for all shifts of the power assembly that varies by less than ten percent.

13. The transmission of example 12, wherein each consecutive shift of the power shift assembly has a gear ratio step delta that varies by less than ten percent.

14. The transmission of example 11, wherein the power shift assembly to configured to provide exactly eight speed modes using only four speed gears and only two range gears; and wherein the variator, speed gears and range gears are carried on parallel shafts that are employed to effect each of the multiple different rotational power flows.

15. The transmission of example 11, wherein the planetary set is a single-row simple planetary gear set having a single carrier, a single sun gear and a single ring gear; and wherein the sun gear is configured to receive rotational input power from the electric machine, the carrier is configured to receive rotational input power from the engine through the input assembly, and the ring gear provides the split-path rotational power to the power shift assembly.

CONCLUSION

The foregoing describes one or more examples of a transmission arrangement suitable for use in work vehicles in which engine and electric power sources are utilized to provide split-path power for tractive or other use in the work vehicle in a number of discreet operational modes. Varying the electric machine varies the power band of the operational modes. Power shift components allow asynchronous shifts and variable shift points between modes. Speed and range gear sets are mounted on parallel shafts in various architectures, including, for example, eight forward and reverse speed modes using four speed gears and two range gears. Other arrangements are contemplated, such as six forward and reverse speed modes in a 3×2 architecture and nine forward and reverse speed modes in a 3×3 architecture. In each, the transmission arrangement is configured with uniform or near-uniform steps, such as within one or two percent, between modes (i.e., from one step to the next) and to allow for a wide power band within each mode, permitting output speeds to double or near double from the low to high end of each mode. The gear ratios effected by the gears are closely constrained, such as near or within 1.5 between successive speed gears and between successive range gears. The transmission arrangement also provides a bilateral (forward and reverse) synchronous creeper mode.

As will be appreciated by one skilled in the art, certain aspects of the disclosed subject matter can be embodied as a method, system (e.g., a work vehicle control system included in a work vehicle), or computer program product. Accordingly, certain embodiments can be implemented entirely as hardware, entirely as software (including firmware, resident software, micro-code, etc.) or as a combination of software and hardware (and other) aspects. Furthermore, certain embodiments can take the form of a computer program product on a computer-usable storage medium having computer-usable program code embodied in the medium.

Any suitable computer usable or computer readable medium can be utilized. The computer usable medium can be a computer readable signal medium or a computer readable storage medium. A computer-usable, or computer-readable, storage medium (including a storage device associated with a computing device or client electronic device) can be, for example, but is not limited to, an electronic, magnetic, optical, electromagnetic, infrared, or semiconductor system, apparatus, or device, or any suitable combination of the foregoing. More specific examples (a non-exhaustive list) of the computer-readable medium would include the following: an electrical connection having one or more wires, a portable computer diskette, a hard disk, a random-access memory (RAM), a read-only memory (ROM), an erasable programmable read-only memory (EPROM or Flash memory), an optical fiber, a portable compact disc read-only memory (CD-ROM), an optical storage device. In the context of this document, a computer-usable, or computer-readable, storage medium can be any tangible medium that can contain, or store a program for use by or in connection with the instruction execution system, apparatus, or device.

A computer readable signal medium can include a propagated data signal with computer readable program code embodied therein, for example, in baseband or as part of a carrier wave. Such a propagated signal can take any of a variety of forms, including, but not limited to, electromagnetic, optical, or any suitable combination thereof. A computer readable signal medium can be non-transitory and can be any computer readable medium that is not a computer readable storage medium and that can communicate, propagate, or transport a program for use by or in connection with an instruction execution system, apparatus, or device.

Aspects of certain embodiments are described herein can be described with reference to flowchart illustrations and/or block diagrams of methods, apparatus (systems) and computer program products according to embodiments of the disclosure. It will be understood that each block of any such flowchart illustrations and/or block diagrams, and combinations of blocks in such flowchart illustrations and/or block diagrams, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions can also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions can also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Any flowchart and block diagrams in the figures, or similar discussion above, can illustrate the architecture, functionality, and operation of possible implementations of systems, methods and computer program products according to various embodiments of the present disclosure. In this regard, each block in the flowchart or block diagrams can represent a module, segment, or portion of code, which includes one or more executable instructions for implementing the specified logical function(s). It should also be noted that, in some alternative implementations, the functions noted in the block (or otherwise described herein) can occur out of the order noted in the figures. For example, two blocks shown in succession (or two operations described in succession) can, in fact, be executed substantially concurrently, or the blocks (or operations) can sometimes be executed in the reverse order, depending upon the functionality involved. It will also be noted that each block of any block diagram and/or flowchart illustration, and combinations of blocks in any block diagrams and/or flowchart illustrations, can be implemented by special purpose hardware-based systems that perform the specified functions or acts, or combinations of special purpose hardware and computer instructions.

Finally, as used herein, the singular forms "a", "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, unless otherwise limited or modified, lists with elements that are separated by conjunctive terms (e.g., "and") and that are also preceded by the phrase "one or more of" or "at least one of" indicate configurations or arrangements that potentially include individual elements of the list, or any combination thereof. For example, "at least one of A, B, and C" or "one or more of A, B, and C" indicates the possibilities of only A, only B, only C, or any combination of two or more of A, B, and C (e.g., A and B; B and C; A and C; or A, B, and C).

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. Explicitly referenced embodiments herein were chosen and described in order to best explain the principles of the disclosure and their practical application, and to enable others of ordinary skill in the art to understand the disclosure and recognize many alternatives, modifications, and variations on the described example(s). Accordingly, various embodiments and implementations other than those explicitly described are within the scope of the following claims.

What is claimed is:

1. A transmission for a work vehicle comprising:
an input assembly having directional clutches and configured to receive rotational input power from an engine of the work vehicle;
an electric machine;
a variator including only a single planetary set configured to receive and combine rotational input power from the electric machine and the input assembly;
a power shift assembly configured to receive the rotational input power from the variator, the power shift assembly comprising:
speed gears;
range gears;
power shift clutches configured to dissipate energy from asynchronous gear meshing, one of the power shift clutches being associated with each of the speed and range gears; and
an output shaft;
wherein the power shift assembly is configured to effect multiple different rotational power flows through to the output shaft that arise from meshing the speed and range gears at each shift of the power shift assembly to effect a unique one of multiple gear ratios;
wherein the planetary set includes a carrier, a sun gear and a ring gear, the sun gear configured to receive rotational input power from the electric machine, the carrier configured to receive rotational input power from the engine through the input assembly, and the ring gear providing rotational input power to the power shift assembly.

2. The transmission of claim 1, wherein the power shift assembly has a gear ratio step delta for all shifts of the power assembly that varies by less than ten percent.

3. The transmission of claim 1, wherein the power shift assembly has a gear ratio step delta for all shifts of the power assembly that varies by less than five percent.

4. The transmission of claim 1, wherein each consecutive shift of the power shift assembly has a gear ratio step delta that varies by less than ten percent.

5. The transmission of claim 1, wherein each consecutive shift of the power shift assembly has a gear ratio delta of less than 2.0.

6. The transmission of claim 1, wherein the speed gears effect gear ratios that vary by less than 2.0 from one another and the range gears effect gear ratios that vary by less than 2.0 from one another.

7. The transmission of claim 1, wherein the power shift assembly to configured to provide exactly eight split-path speed modes using only four speed gears and only two range gears, the split-path speed modes having combined power from the engine and the electric machine.

8. The transmission of claim 1, wherein the variator, speed gears and range gears are carried on parallel shafts that are employed to effect each of the multiple different rotational power flows.

9. The transmission of claim 1, further including a further electric machine being rotational tied to the engine through the input assembly and configured to receive rotational input power from the engine.

10. The transmission of claim 1, wherein the directional clutches of the input assembly include a forward clutch and a reverse clutch.

11. A transmission for a work vehicle comprising:
an input assembly having directional clutches and configured to receive rotational input power from an engine of the work vehicle;
an electric machine;
a variator including only a single planetary set configured to receive rotational input power from the electric machine and the input assembly, the variator configured to sum the rotational input power from the electric machine and the engine to provide a split-path rotational power;

a power shift assembly configured to receive the split-path rotational power from the variator, the power shift assembly comprising:

speed gears;

range gears;

power shift clutches configured to dissipate energy from asynchronous gear meshing, one of the power shift clutches being associated with each of the speed and range gears; and an output shaft;

wherein the power shift assembly is configured to effect multiple different rotational power flows at different gear ratios through to the output shaft that arise from meshing the speed and range gears at each shift of the power shift assembly to effect a unique one of multiple gear ratios;

wherein the planetary set is a single-row simple planetary gear set having a single carrier, a single sun gear and a single ring gear; and wherein the sun gear is configured to receive rotational input power from the electric machine, the carrier is configured to receive rotational input power from the engine through the input assembly, and the ring gear provides the split-path rotational power to the power shift assembly.

12. The transmission of claim 11, wherein the power shift assembly has a gear ratio step delta for all shifts of the power assembly that varies by less than ten percent.

13. The transmission of claim 11, wherein each consecutive shift of the power shift assembly has a gear ratio step delta that varies by less than ten percent.

14. The transmission of claim 11, wherein each consecutive shift of the power shift assembly has a gear ratio delta of less than 2.0.

15. The transmission of claim 11, wherein the power shift assembly to configured to provide exactly eight speed modes using only four speed gears and only two range gears.

16. The transmission of claim 11, wherein the variator, speed gears and range gears are carried on parallel shafts that are employed to effect each of the multiple different rotational power flows.

17. The transmission of claim 11, further including a further electric machine being rotational tied to the engine through the input assembly and configured to receive rotational input power from the engine.

18. The transmission of claim 11, wherein the directional clutches of the input assembly include a forward clutch and a reverse clutch.

* * * * *